US012236930B2

(12) United States Patent
Washburn et al.

(10) Patent No.: US 12,236,930 B2
(45) **Date of Patent: *Feb. 25, 2025**

(54) SOUND-ATTENUATING DEVICE AND METHOD OF USE THEREOF

(71) Applicants: Olivia Washburn, Orem, UT (US); Stephen Washburn, Orem, UT (US); Melissa Washburn, Orem, UT (US)

(72) Inventors: Olivia Washburn, Orem, UT (US); Stephen Washburn, Orem, UT (US); Melissa Washburn, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,964

(22) Filed: Apr. 10, 2023

(65) Prior Publication Data

US 2023/0360625 A1 Nov. 9, 2023

Related U.S. Application Data

(63) Continuation of application No. 17/151,579, filed on Jan. 18, 2021, now abandoned, which is a continuation-in-part of application No. 16/373,646, filed on Apr. 3, 2019, now Pat. No. 10,897,666.

(60) Provisional application No. 62/826,994, filed on Mar. 30, 2019, provisional application No. 62/652,238, filed on Apr. 3, 2018.

(51) Int. Cl.

| | |
|---|---|
| ***H04R 1/10*** | (2006.01) |
| ***A42B 1/06*** | (2021.01) |
| ***G10K 11/168*** | (2006.01) |
| ***H04R 5/033*** | (2006.01) |

(52) U.S. Cl.
CPC .............. *G10K 11/168* (2013.01); *A42B 1/06* (2013.01); *H04R 1/1008* (2013.01); *H04R 1/1058* (2013.01); *H04R 1/1083* (2013.01); *H04R 1/1091* (2013.01); *H04R 5/0335* (2013.01); *H04R 2460/15* (2013.01)

(58) Field of Classification Search
CPC .. H04R 1/1008; H04R 1/1058; H04R 1/1083; H04R 1/1091; H04R 5/0335; H04R 2460/15; H04R 1/105; A61F 11/14; G10K 11/168; A42B 1/06; A42B 1/0188
See application file for complete search history.

(56) References Cited

U.S. PATENT DOCUMENTS

| | | | | |
|---|---|---|---|---|
| 5,241,971 | A | 9/1993 | Lunin | |
| 5,996,123 | A | 12/1999 | Leight | |
| 6,353,938 | B1 | 3/2002 | Young | |
| 7,024,013 | B1 | 4/2006 | Van Dam | |
| 7,703,572 | B2 | 4/2010 | Du | |
| 7,853,034 | B1 * | 12/2010 | Gresko | H04R 5/033 381/372 |
| 10,897,666 | B2 * | 1/2021 | Washburn | H04R 1/1058 |

(Continued)

*Primary Examiner* — Huyen D Le
(74) *Attorney, Agent, or Firm* — Ongs Law Firm PLLC; Jacob Ong

(57) ABSTRACT

A sound-attenuating assembly may have a headpiece and two covered dampening assembly that may be detachably attached to the locations of the headpiece that oppose a wearer's ear; the dampening assembly may have a padded member member that may be in contact with a dividing member that may be in a contact with a compressible member which may be disposed within a concave member; the dampening assembly may be disposed within a cover such a fastener of the cover detachably attaches to a fastener of the headpiece.

8 Claims, 25 Drawing Sheets

(56) References Cited

U.S. PATENT DOCUMENTS

| | | | | |
|---|---|---|---|---|
| 2009/0178177 | A1* | 7/2009 | Fairclough | A42B 1/0188 2/209 |
| 2019/0110930 | A1 | 4/2019 | Hakansson | |
| 2020/0296501 | A1 | 9/2020 | Freeman | |

* cited by examiner

Figure 26D Top View
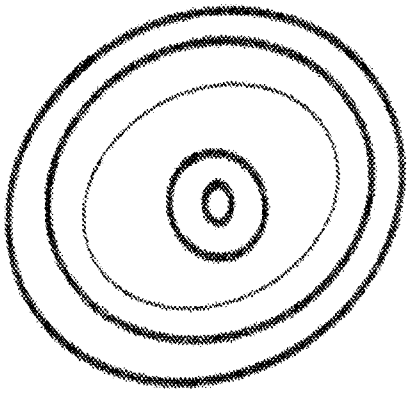
Figure 26E Bottom View
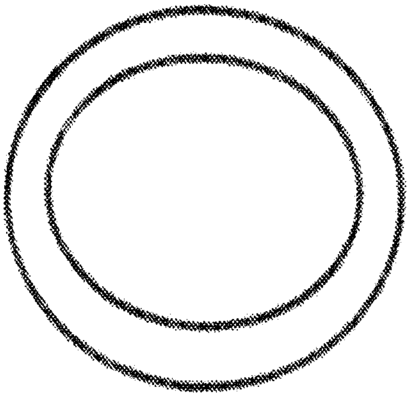
Figure 26A
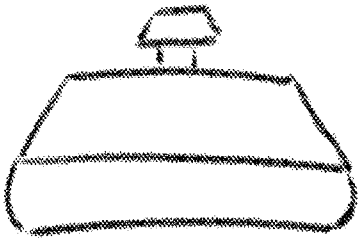
Figure 26B
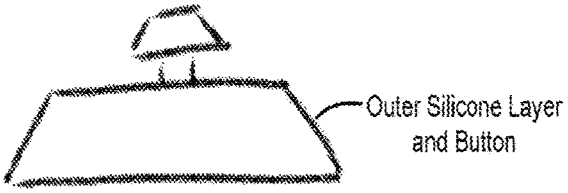
Figure 26C
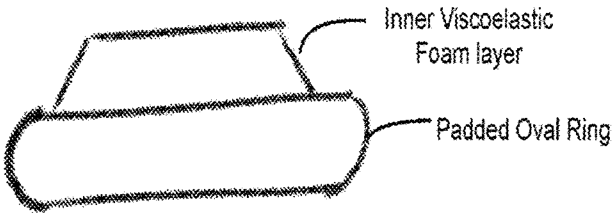

Figure 27C Top View

Velcro adjustment on front
Velcro adjustment on back
Full coverage of earpiece and button attachment from earpiece to attach to headband

SOUND-ATTENUATING DEVICE AND METHOD OF USE THEREOF

CROSS-REFERENCE TO RELATED APPLICATIONS

This application is a continuation of U.S. patent application Ser. No. 17/151,579, which was filed on 2021 Jan. 8, which is a continuation-in-part of U.S. patent application Ser. No. 16/373,646, which was filed on 2019 Apr. 3 (and was issued as U.S. patent Ser. No. 10/897,666, which was issued on 2021 Jan. 19), which claimed the benefit of the following two Provisional Patent Applications: 1) U.S. Provisional Patent Application No. 62/826,994, which was filed on 2019 Mar. 30, and 2) U.S. Provisional Patent Application No. 62/652,238, which was filed on 2018 Apr. 3. The benefit of priority to the filing dates of these applications is hereby claimed. The subject matter of all of these applications is expressly incorporated herein by reference in their entirety for all purposes.

BACKGROUND OF THE INVENTION

1. The Field of the Invention

The present invention relates generally to sound attenuating devices for ears, and more specifically to a sound attenuating device for a neonatal device; certain embodiments may be used for individuals who are greater in age than an infant such as a child, adolescent, or adult.

The figures are illustrative, give examples, and are not supposed to be limiting. Coupled means to be in direct or indirect contact with another object; in preferred embodiments two or more objects that are coupled may be affixed by some type of physical or nonphysical means such as glue, screw, nail, mating connections, threaded connections, soldering, which also includes being detachably affixed which means that a substantially temporary means has been used to affix the two or more objects. As mentioned above, indirect coupling includes Object A being coupled to Object B and Object C being coupled to Object B would mean that Object A is coupled to Object C even if Object A is not physically contacting Object C. Additional elements may be coupled to each other in this manner.

2. Background

When an infant is in the womb, it is protected from potentially damaging ambient noise by the mother's body. More specifically, the mother's body suppresses sound by approximately 15 dB in the mid to high frequency range. Such sound protection is especially important during the last trimester, since auditory neural pathways begin to form at that time. Unfortunately, some infants are born prematurely and must be maintained in a neonatal intensive care unit (NICU) of a hospital. Because of the nature of the NICU, much noise throughout the frequency spectrum is generated from the activity of nurses, phones, bells, alarms, etc. Noise levels in the NICU may range from 60 dB to 120 dB; 60 dB is around the sound level of normal conversation, and 120 dB may be the level of an ambulance siren. Sound levels in the NICU may be above the safe range over 70% of the time. Such noises may adversely affect the infant in many ways, such as by leading to stress which may lead to tachycardia and hypoxia. Such an exposure may lead to long term issues such as Auditory Processing Disorder, and infants that spend time in the NICU are more likely to develop learning disabilities. For example, the infant's reactions to the stress burns many calories, thus potentially adversely affecting its growth during a critical phase of its life. The noise may keep the infant from getting much needed sleep, and, if antibiotics are administered to the infant, the noise could promote antibiotic attack on sensory mechanisms in the auditory system. Thus, protecting neonatal infants from harmful sounds which arise in the NICU environment is very desirable. On the other hand, since auditory neural pathways are being formed at that time, it is not desirable to attenuate too much sound, because overly isolating the infant from sound may inhibit neural development.

At this point in time, certain devices have been disclosed or published, such as U.S. Pat. No. 5,243,709; US Pat Appl. Pub. 2018/0177641; US20130046219A1; US20130133671A1; US20090178177A1; and, US20100014686A1.

SUMMARY OF INVENTION

EMBODIMENT 1: A sound attenuating assembly 100 configured to be worn by a human, comprising:

- a headpiece 113 comprising an inner surface;
- a covered-dampening assembly 200 comprising
  - a cover 300; and,
  - a dampening assembly 400 disposed within the cover 300;
  - the dampening assembly 400 comprising:
    - a padded member 108;
    - a compressible member 104;
    - a concave member 102;
    - wherein the padded member 108 is coupled to the cover 300, the padded member 108 is coupled to the compressible member 104.

EMBODIMENT 2. The sound attenuating assembly of EMBODIMENT 1, wherein the dampening assembly further comprises a separating member 106 disposed between the padded member 108 and the compressible member 104; wherein the separating member 106 is coupled to the member 108 and is coupled to the compressible member 104.

EMBODIMENT 3. The sound attenuating assembly 100 of EMBODIMENT 2 wherein the concave member 102 comprises a silicone surface.

EMBODIMENT 4. The sound attenuating assembly 100 of EMBODIMENT 3 wherein the compressible member 104 comprises a foam material.

EMBODIMENT 5. The sound attenuating assembly 100 of EMBODIMENT 4 wherein the compressible member 104 further comprises a foam material selected from the group consisting of a viscoelastic foam, a memory foam, a Dunlop latex foam, and a furniture foam. (The foam may have one or more of the following properties: elasticity, porosity, thickness, and cell size.)

EMBODIMENT 6. The sound attenuating assembly 100 of EMBODIMENT 5, wherein the padded member 108 comprises a cloth outer shell 220 substantially engulfing an amount of insulating material 222.

EMBODIMENT 7. The sound attenuating assembly 100 of EMBODIMENT 6 wherein the cloth outer shell 220 of padded member 104 comprises wool and the amount of insulating material 222 comprises cotton. [padded member 108 may be made from a quilted wool/cotton blend, the stuffing of padded member 108 may be also made from a quilted wool/cotton blend; the stuffing of padded member 108 may be made of cotton, batting, a cotton-blend or some other compressible material including foam.]

EMBODIMENT 8. The sound attenuating assembly 100 of EMBODIMENT 2 wherein the separating member 106 comprises cardstock.

EMBODIMENT 9. The sound attenuating assembly 100 of EMBODIMENT 8 wherein the cardstock comprises 140 pound cardstock.

EMBODIMENT 10. The sound attenuating assembly 100 of EMBODIMENT 1 wherein the covered dampening assembly 200 is disposed within a pocket 230, (see embodiments in FIGS. 20 and 21), the pocket 230 (see an embodiment in FIG. 23) being coupled to a lateral, inner surface 232 of the headpiece 113.

EMBODIMENT 11. The sound attenuating assembly 100 of EMBODIMENT 11, the pocket 230 nestling against a human ear.

EMBODIMENT 12. The sound attenuating assembly 100 of EMBODIMENT 1, wherein the headpiece 113 comprises a patch 702 for fastening coupled to a lateral, inner ear flap surface of the headpiece 113.

EMBODIMENT 13. The sound attenuating assembly 100 of EMBODIMENT 1, wherein the fastening patch 702 for fastening further comprises a first fastener surface selected from the group consisting of a hook-and-loop fastener, a magnetic fastener, a hook-and-pile fastener, a zipper, a button, a reclosable fastener. (Dual Lock may be used; and the fastening patch 500 may be coupled by sewing or other means such that the patch 702 for fastening may be coupled by sewing or other means such that the fastening patch is not easily dislodged when an infant, who is wearing the headpiece 113 having the fastening patch, tosses and turns).

EMBODIMENT 14. The sound attenuating assembly 100 of EMBODIMENT 13 wherein the covered dampening assembly 200 further comprises a second fastener surface detachably coupled to the first fastener surface, wherein the second fastener surface is selected from the group consisting of a hook-and-loop fastener, a magnetic fastener, a hook-and-pile fastener, a zipper, a button, a reclosable fastener.

EMBODIMENT 15. The sound attenuating assembly 100 of EMBODIMENT 14 wherein the headpiece 113 further comprises a chinstrap 502 having a third fastener and a fourth fastener coupled to an edge portion of the headpiece 113, the third fastener being detachably coupled to the fourth fastener.

EMBODIMENT 16. The sound attenuating assembly 100 of EMBODIMENT 15 wherein an average thickness of the compressible member is greater than an average thickness of the concave member.

A method of using a sound attenuating assembly comprising providing a dampening assembly comprising a padded member 108; a separating member; a compressible member 104; and a concave member;

providing a headpiece 113 having a fastener at a first ear-adjacent location (700 *a*) and having a second fastener at a second ear-adjacent location (700 *b*);

substantially disposing the dampening assembly within a cover having a foldable thereby forming a covered dampening assembly 200;

detachably attaching an outward facing detachable fastener of the covered dampening assembly 200 to the fastener at the ear-adjacent location of the headpiece 113;

a sound attenuating assembly 100 configured to be worn by a human, comprising:

a headpiece 113 comprising an inner surface, the inner surface having an ear flap area disposed upon said inner surface; the ear flap area comprising a first fastener surface fixable attached to inner surface;

a covered dampening assembly 200 comprising a cover 300; and, a dampening assembly 400 disposed within the cover 300; the dampening assembly 400 comprising:

a padded member 108;

a separating member 106 disposed between the padded member 108 and the compressible member 104;

wherein the padded member 108 is coupled to the cover 300, the padded member 108 is coupled to the compressible member 104;

a second fastener surface being disposed upon the cover and being detachably fastened to the first fastener surface.

BRIEF DESCRIPTION OF THE DRAWINGS

The preferred embodiments of the present invention will be described in conjunction with the appended drawings. Various sizes and shapes and configurations of the parts of the mountable watering assembly are contemplated; various sizes of fasteners may be used depending on size and spacing of the rails of a railing system, such as a railing system that may be installed on a deck. Like designations denote like elements, and:

FIG. 26A depicts an embodiment of the earpiece dampening assembly.

FIG. 26B depicts an embodiment of the silicone layer and button of the earpiece dampening assembly.

FIG. 26C depicts an embodiment of the inner viscoelastic foam layer and padded oval ring of the earpiece dampening assembly.

FIG. 26D depicts a top view of the embodiment shown in FIG. 26A.

FIG. 26E depicts a bottom view of the embodiment shown in FIG. 26A.

FIG. 27C depicts top-oblique view of embodiment shown in FIG. 27B.

DETAILED DESCRIPTION OF EMBODIMENTS OF THE INVENTION

Figure 1A:
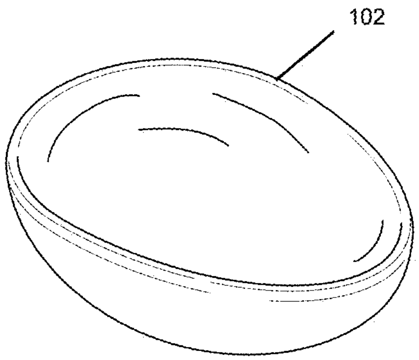
FIG. 1A depicts a perspective view of an embodiment of a concave member 102.
Figure 1B:
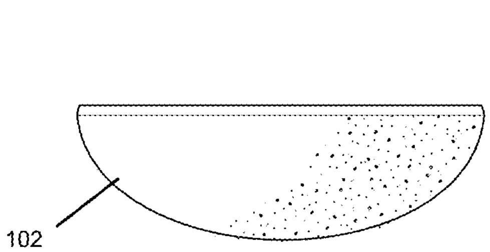
FIG. 1B shows a side view of the embodiment in FIG. 1A.
Figure 1C:
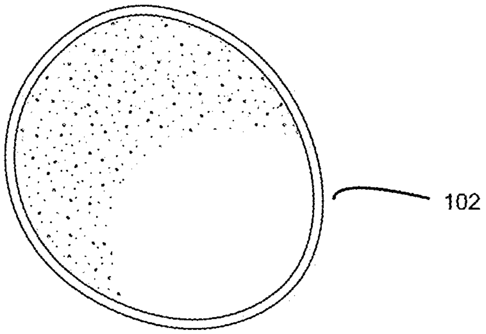
FIG. 1C shows a top view of the embodiment in FIG. 1A.
Figure 2A:
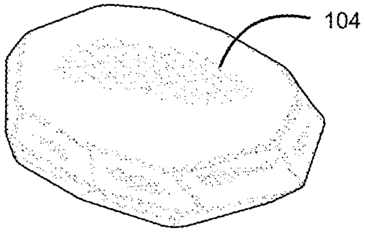
FIG. 2A shows a perspective view of an embodiment of a compressible member 104.
Figure 2B:
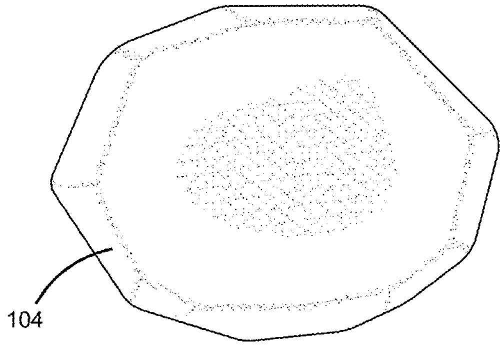
FIG. 2B shows a top view of the compressible member 104 of FIG. 2A.
Figure 3A:
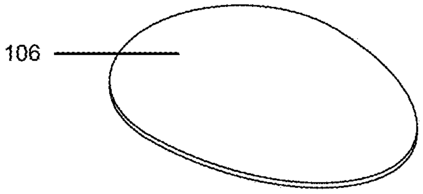
FIG. 3A shows a perspective view of an embodiment of dividing member 106.
Figure 3B:
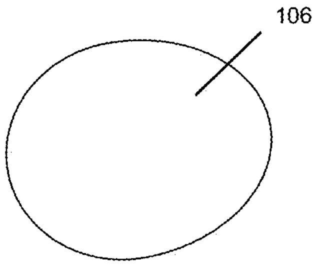
FIG. 3B shows a top view of the embodiment of FIG. 3A.
Figure 3C:
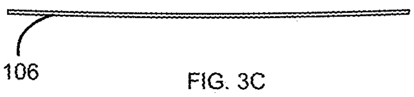
FIG. 3C shows a side view of the embodiment of FIG. 3A.
Figure 4A:
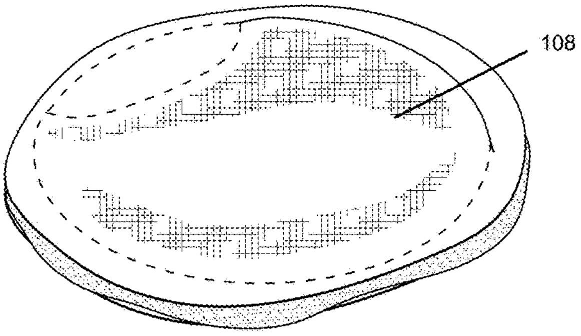
FIG. 4A depicts an embodiment of a padded member 108.
Figure 4B:
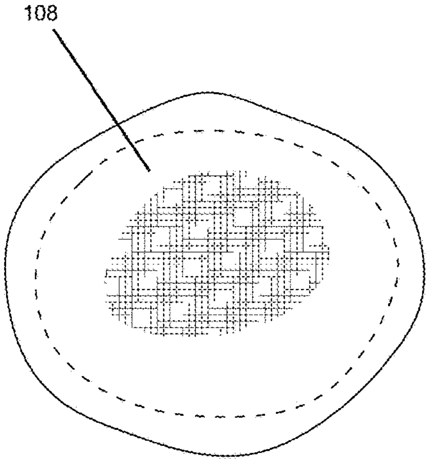
FIG. 4B depicts a top view of the embodiment of FIG. 4A.
Figure 4C:
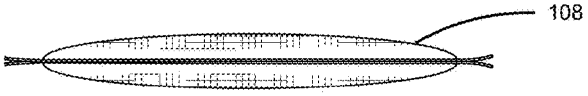
FIG. 4C depicts a side view of the embodiment of FIG. 4A.

Padded member 108 may be made from a quilted wool/cotton blend, the stuffing of padded member 108 may be also made from a quilted wool/cotton blend; the stuffing of padded member 108 may be made of cotton, batting, a cotton-blend or some other compressible material including foam.

The foam may have one or more of the following properties: elasticity, porosity, thickness, and cell size.

Dual Lock may be used; and the patch 702 for fastening may be coupled by sewing or other means such that the fastening patch is not easily dislodged when an infant, who is wearing the headpiece 113 having the fastening patch, tosses and turns.

In some embodiments, materials used in the assembly or devices preferably lower sound levels between 20-30 dB. Materials that are used in the assembly or devices preferably dampen sound instead of deadening sound; in other words, materials preferably attenuate sound instead of completely canceling sound or noise. Some materials which may be incorporated in the assembly or device maybe medical grade materials. In the preferred embodiments, materials which are used in the assembly or device are not overly rigid and have some degree of flexibility.

In the preferred embodiments, headpiece 113 and the sound attenuating assembly may be configured to be compatible with the use of medical devices such as tubes and CPAP oxygen machines. The use or disclose invention is not limited to prematurely born infants and different embodiments of the invention may be used with infants, prematurely born infants, children, adolescents, adults, senior citizens and disabled people, and consequently, the sound attenuating assembly 100 and its components may be of various sizes and shapes. Premature babies may vary greatly in size, weight, and head circumference. In preferred embodiments a baby or individual may lay on top of the sound attenuating assembly and its components without being damaged. In the preferred embodiments the components of the sounds in the assembly 100 are not substantially bulky. In the preferred embodiments, the headpiece is configured to fit snuggly with an individual such as a baby. In the preferred embodiments the headpiece is not configured to fit so tightly that the user experiences great discomfort or has decreased blood flow areas in the areas that are contacted by the headpiece.

In some embodiments, the headpiece may be of a size that fits a premature baby of various sizes or an individual regardless of the individuals age or size.

In the preferred embodiments, the dampening assembly, which is the portion that may attenuate sound, may be sized to cover an entire ear of an individual. Preferably, two dampening assembly may be used so that each ear may be covered. Preferably headpiece 113 does not cover the eyes or nose of an individual or prematurely born infant. Preferably nurses or other caretakers may remove headpiece 113 and its component with substantial ease. Preferably headpiece 113 and its component do not interfere, or only minimally interfere, with medical devices that may be in use with a prematurely born infant who may be using IVs, feeding tubes, bilirubin glasses, oxygen, ventilator, nasal cannula, CPAP, head sensors, incisions, etc.

Any listed measurements are only exemplary; preferable ranges may fall within −10% and +10% of the stated measurement values; preferable ranges fall may within −30% and +30% of the stated measurement values; some ranges fall may within −50% and +50% of the stated measurement values; some ranges fall may within −90% and +1000% of the stated measurement values.

The following components may be included individually or in combination with other components which are listed herein; details are exemplary and nonlimiting.

Figure 17A:
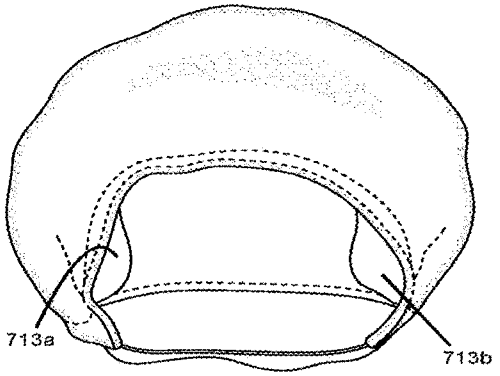
FIG. 17*a* depicts the front view of the headpiece 113 of FIG. 15.
Figure 17B:
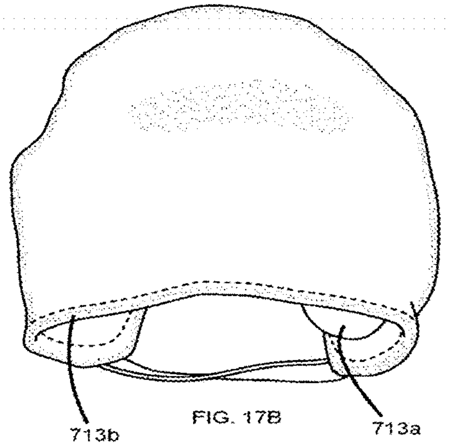
FIG. 17B depicts a back view of the headpiece 113 of FIG. 15.
Figure 18A:
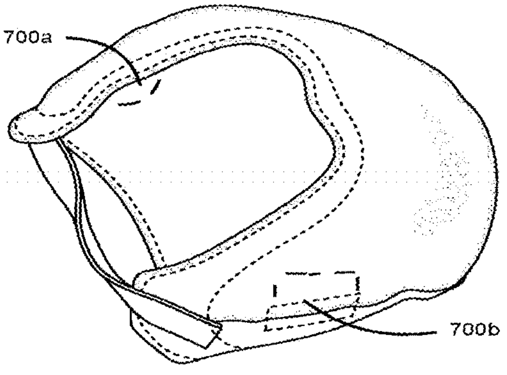
FIG. 18A depicts a perspective view of an embodiment of a headpiece 113.
Figure 18B:
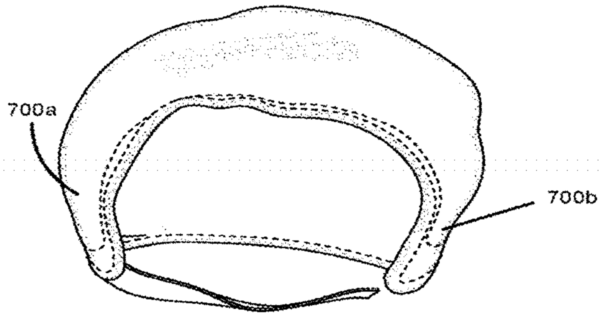
FIG. 18B depicts a front view of the embodiment of the headpiece 113 of FIG. 18A.
Figure 19:
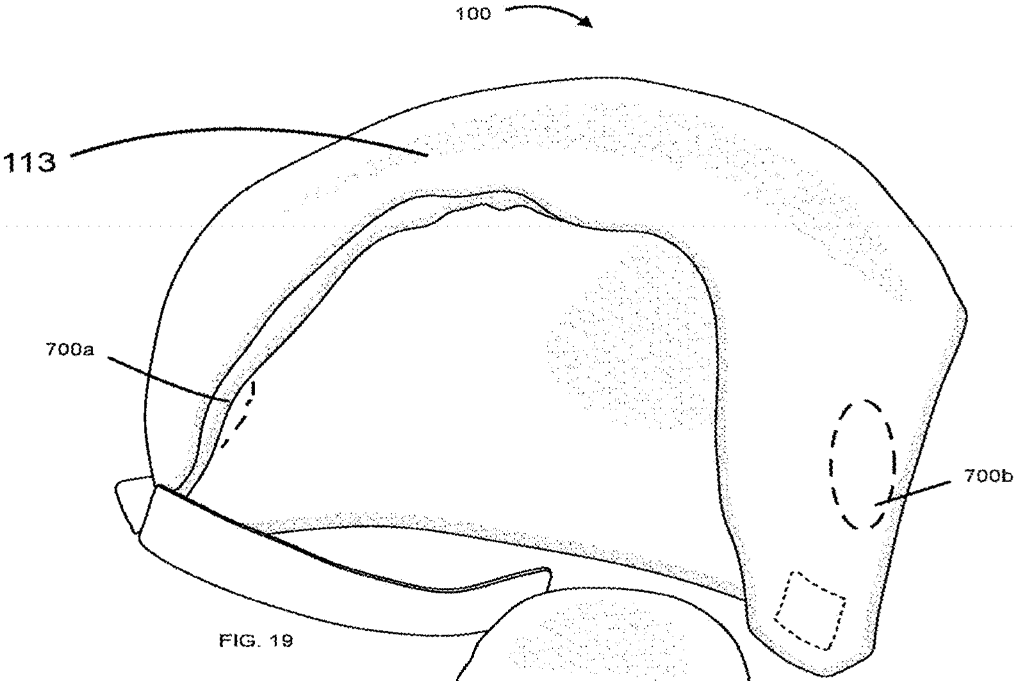
FIG. 19 depicts a partial perspective view of the embodiment of the headpiece 113 of FIG. 18A.
Figure 20:
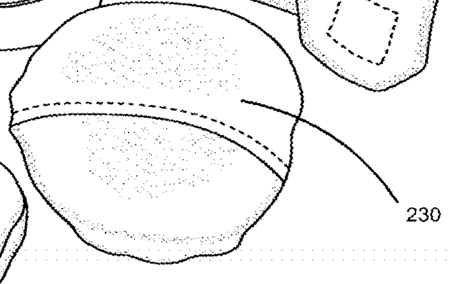
FIG. 20 depicts an embodiment of a covered dampening assembly.
Figure 21:
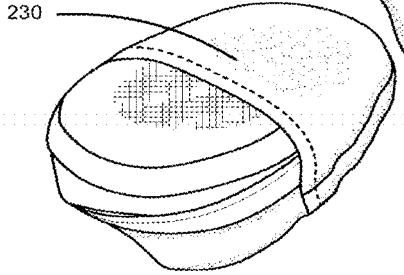
FIG. 21. depicts an embodiment of the covered dampening assembly of FIG. 20.
Figure 22A:
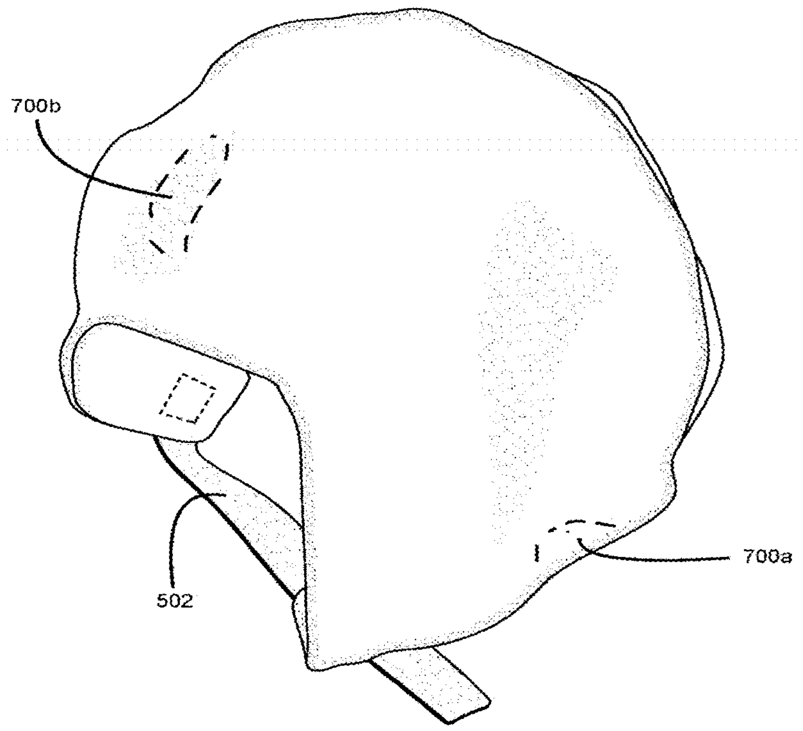
FIG. 22A depicts a perspective back view of the embodiment shown in FIG. 18A.
Figure 22B:
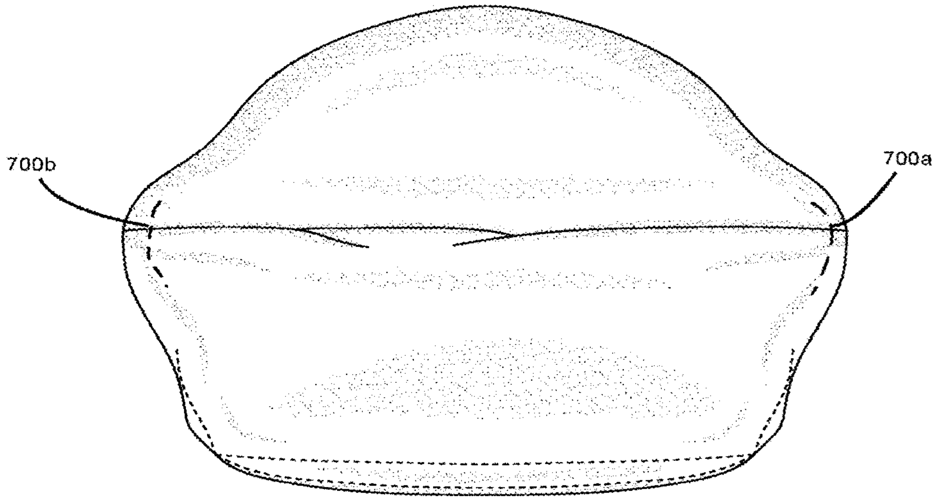
FIG. 22B shows a top view of the embodiment shown in FIG. 18A.
Figure 23:
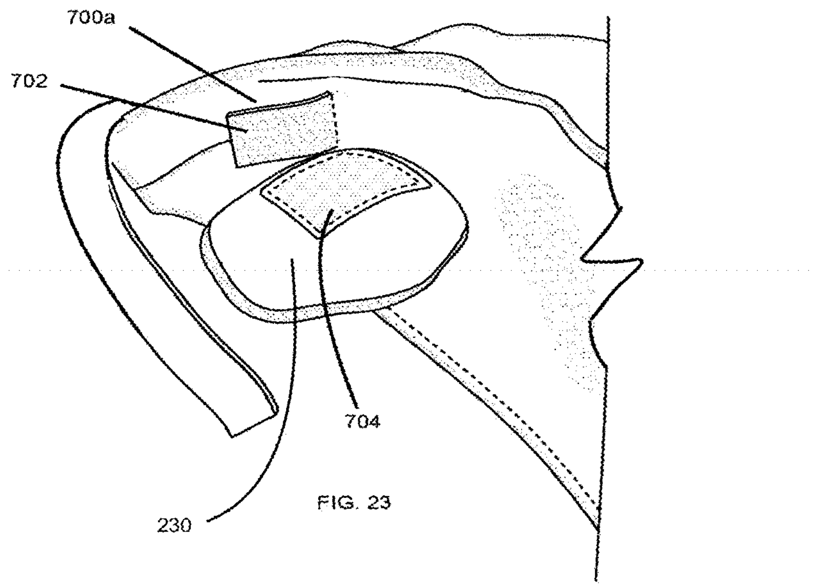
FIG. 23 shows a partial view of the embodiment of FIG. 18 as well as a perspective back view of a covered dampening assembly.
Figure 24:
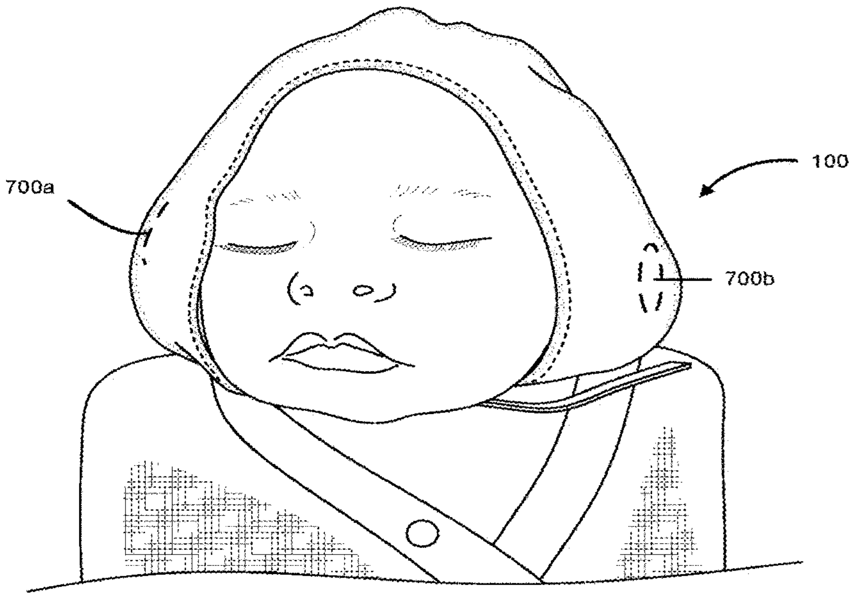
FIG. 24 shows an infant wearing the headpiece 113 of 18A.
Figure 25A:
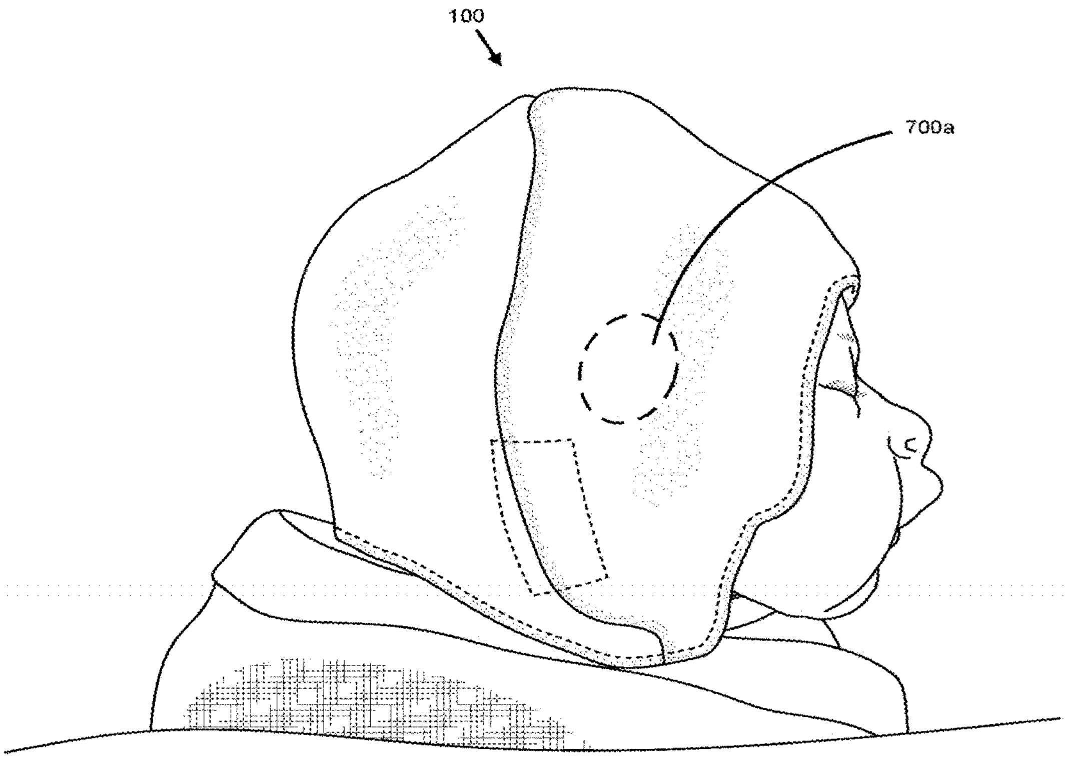
FIG. 25A shows a side view of what is shown in FIG. 24.
Figure 25B:
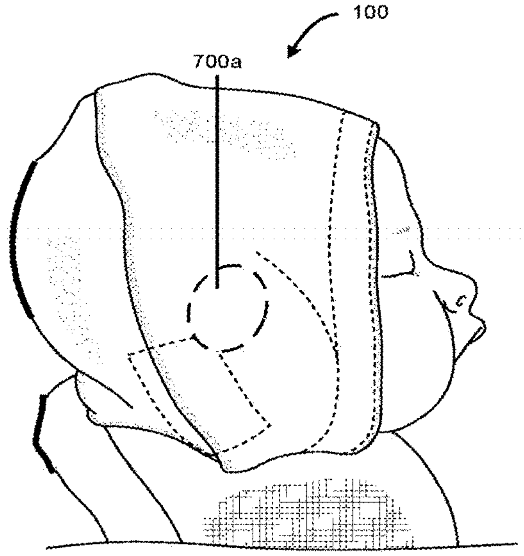
FIG. 25B shows a side perspective view of what is shown in FIG. 25A.
Figure 25C:
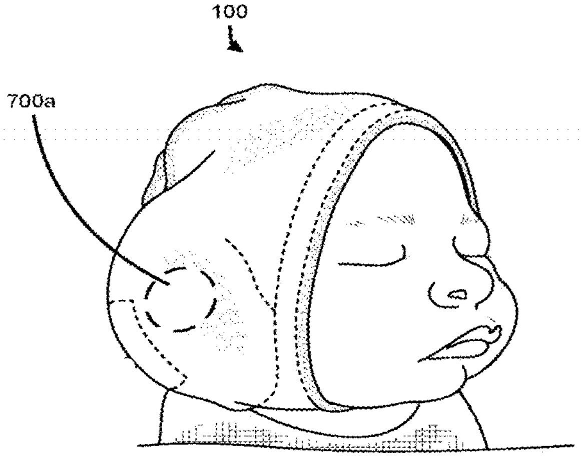
FIG. 25C shows a front-side perspective view of what is shown in FIG. 25B.
Figure 25D:
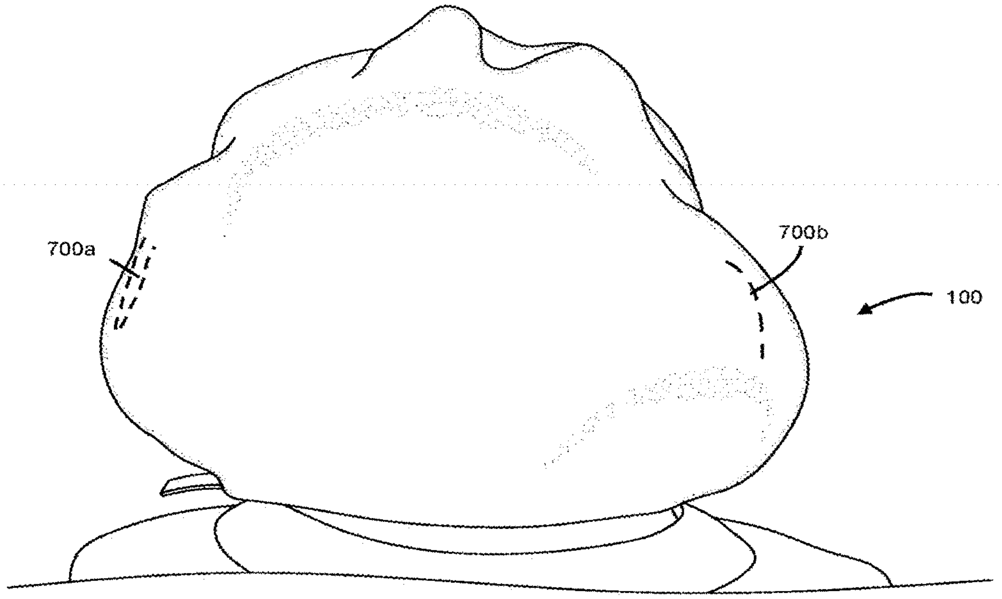
FIG. 25D shows a back view of what is shown in FIG. 25C.
Figure 25E:
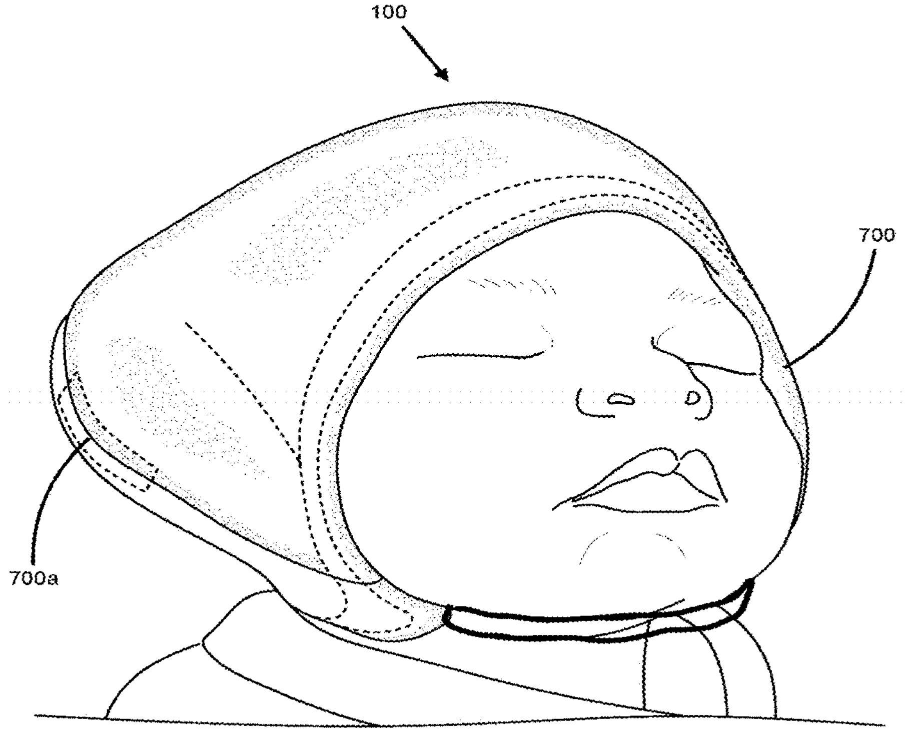
FIG. 25E shows a frontal upward facing view of what is shown in FIG. 25D.
Figure 27A:
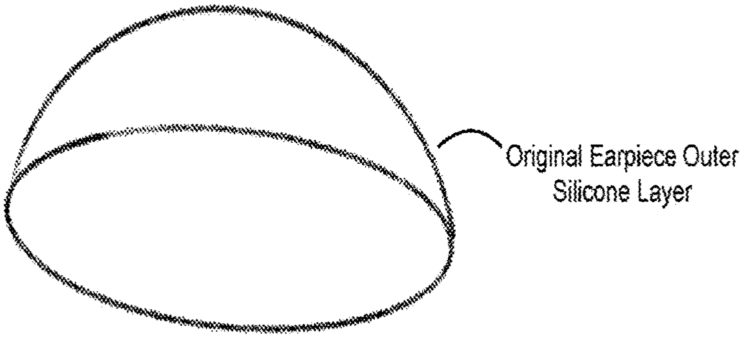
FIG. 27A depicts an embodiment of the earpiece dampening assembly outer silicone layer.
Figure 27B:
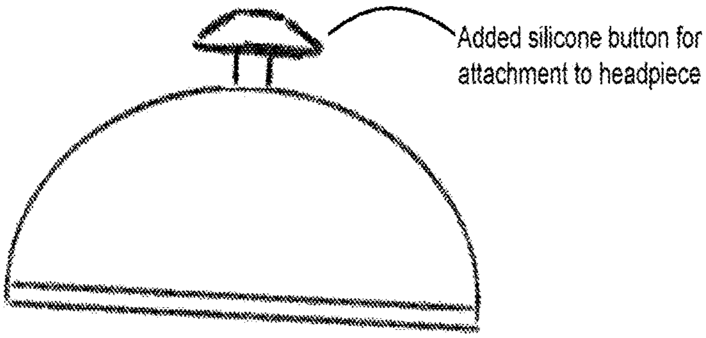
FIG. 27B depicts embodiment of silicone button coupled to embodiment show in FIG. 27A.
Figure 27B:
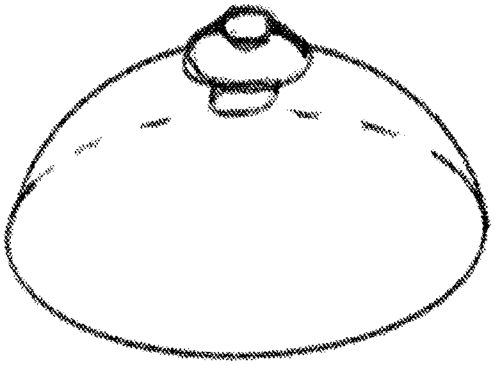
Figure 28A:
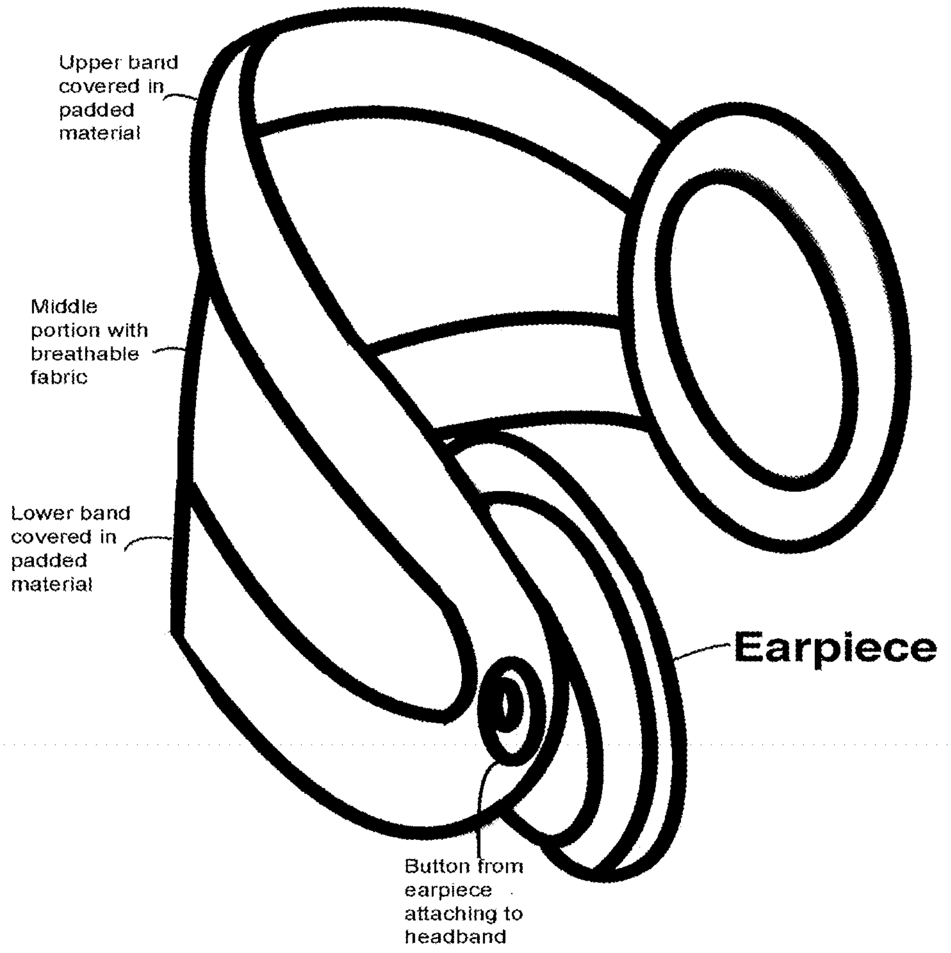
FIG. 28A depicts an embodiment of a behind-the-head headband.
Figure 28B:
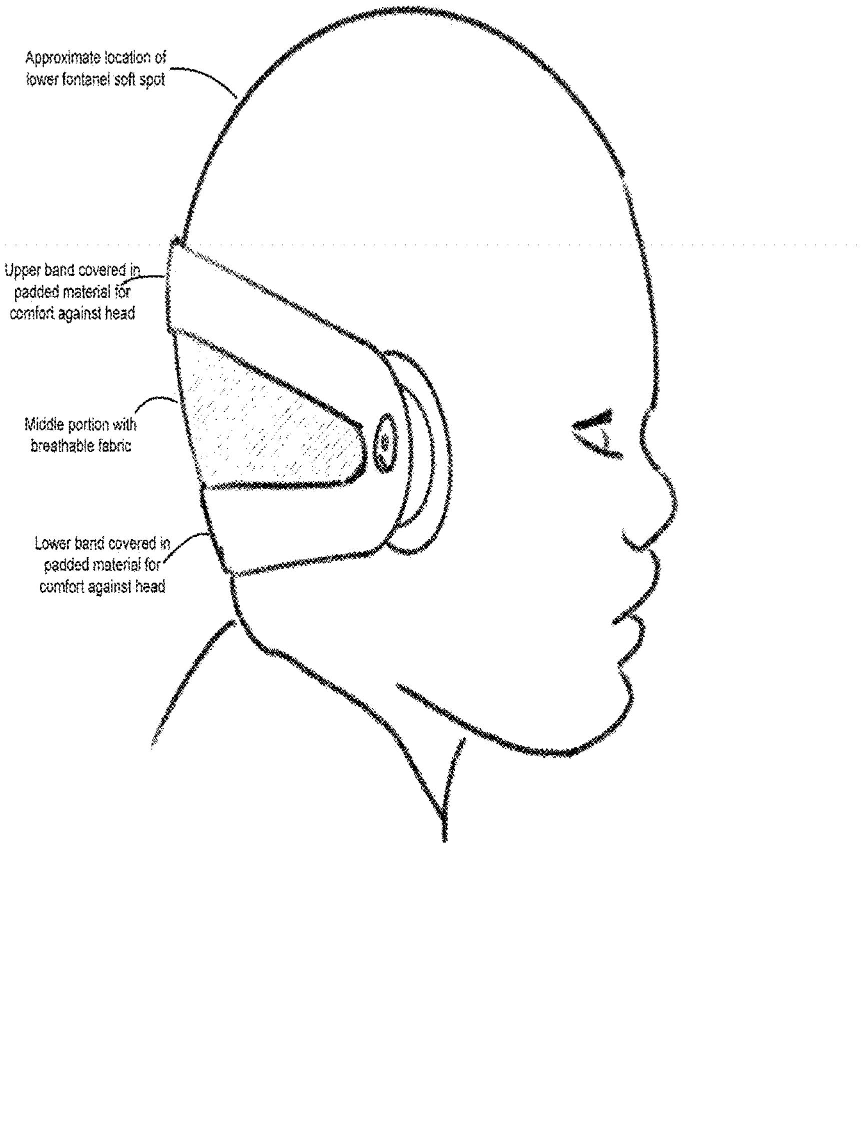
FIG. 28B depicts an infant wearing the embodiment shown in FIG. 28A.
Figure 28C:
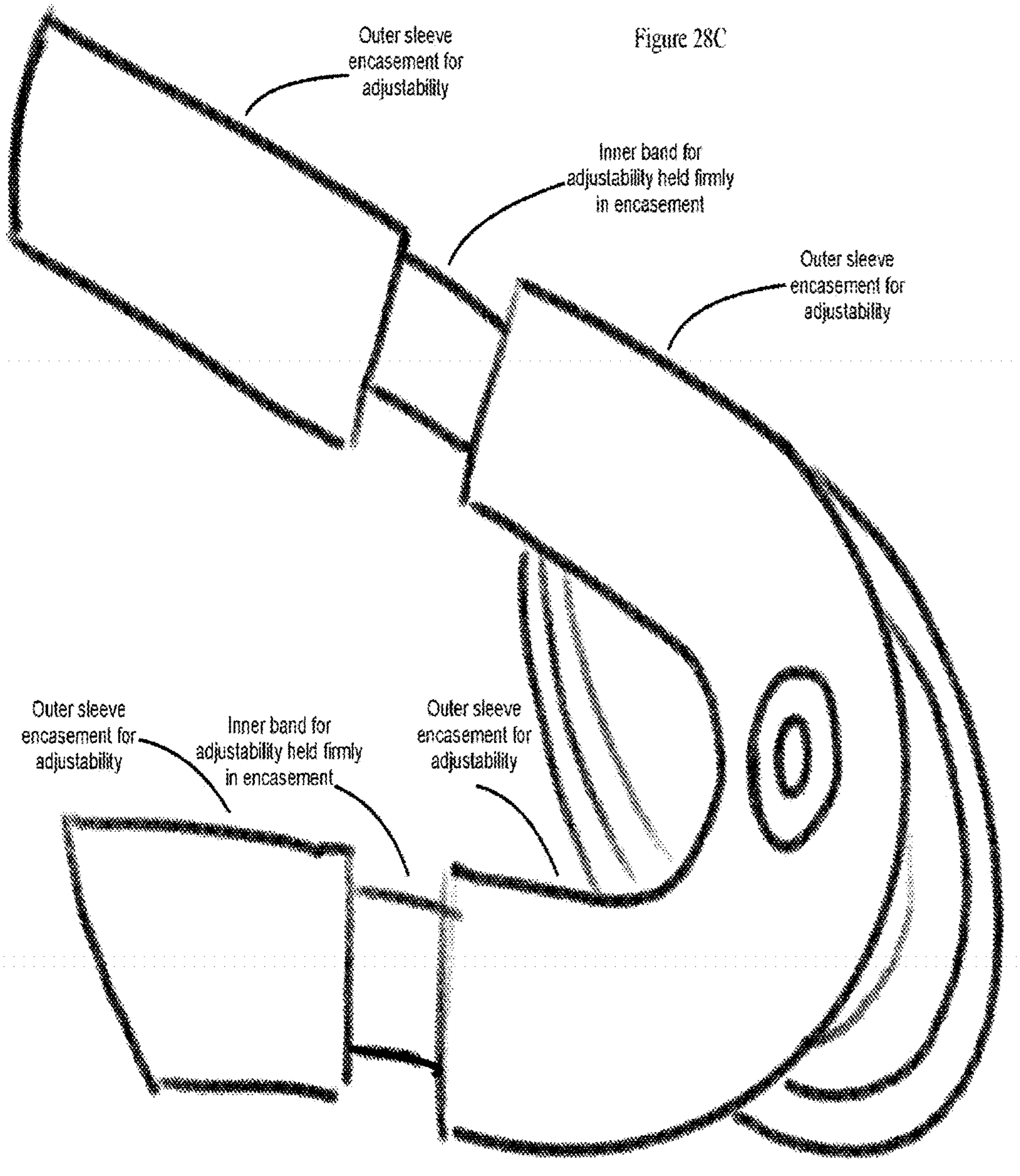
FIG. 28C depicts an embodiment as shown in FIG. 28A adjusted for size.
Figure 28D:
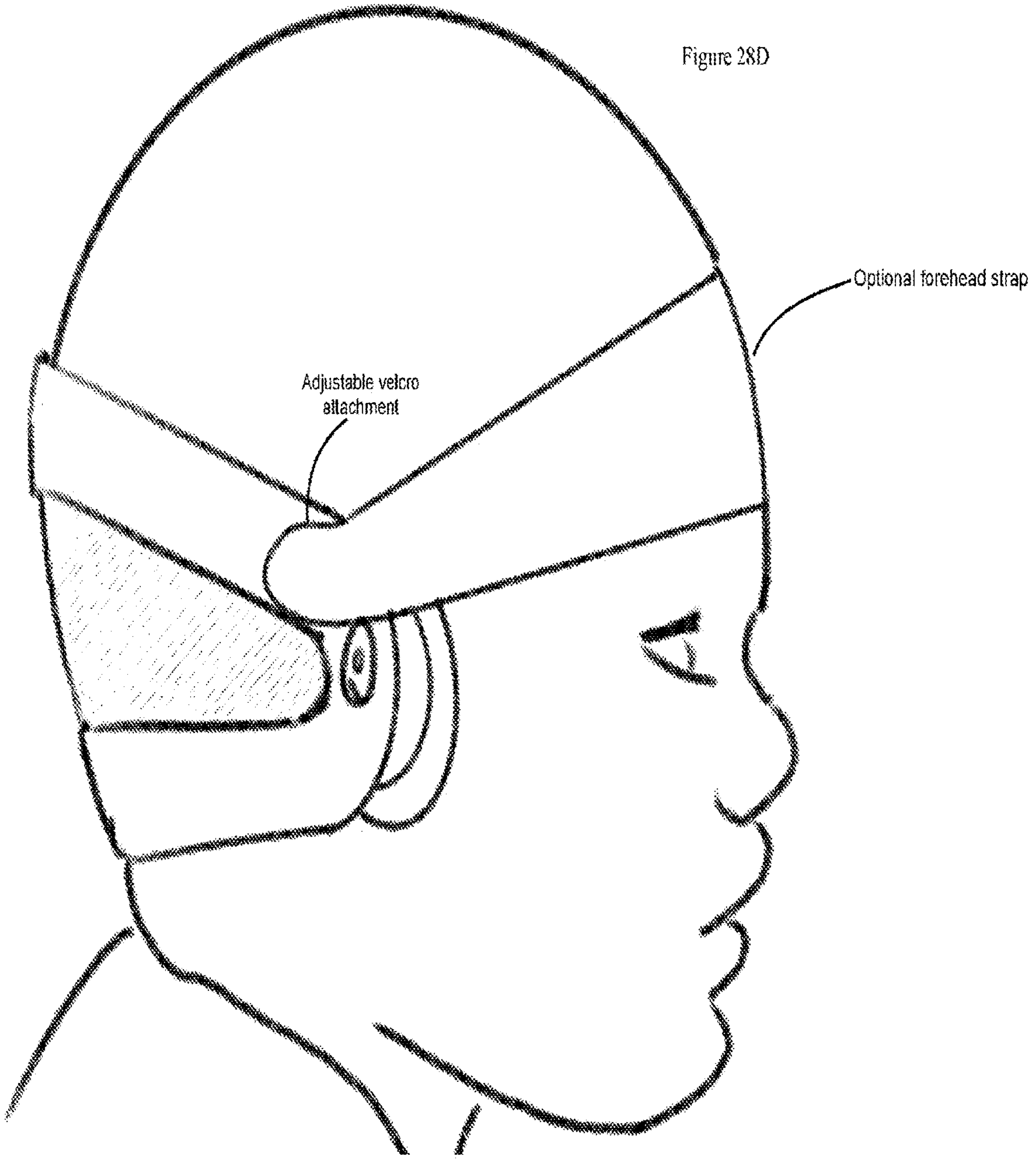
FIG. 28D depicts an infant wearing an adjustable forehead strap coupled to the embodiment shown in FIG. 28A.
Figure 29A:
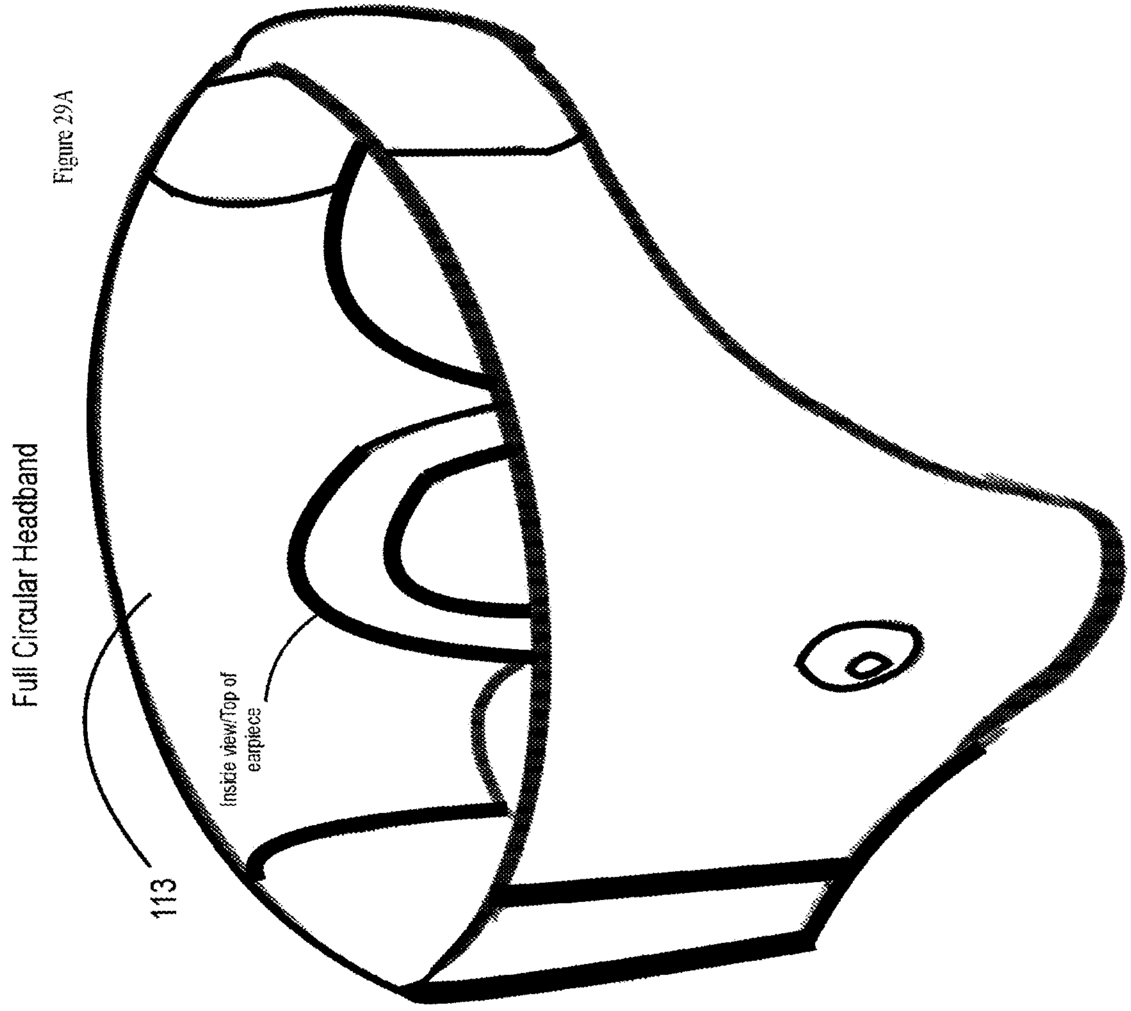
FIG. 29A depicts an of embodiment of a full circular headband.
Figure 29B:
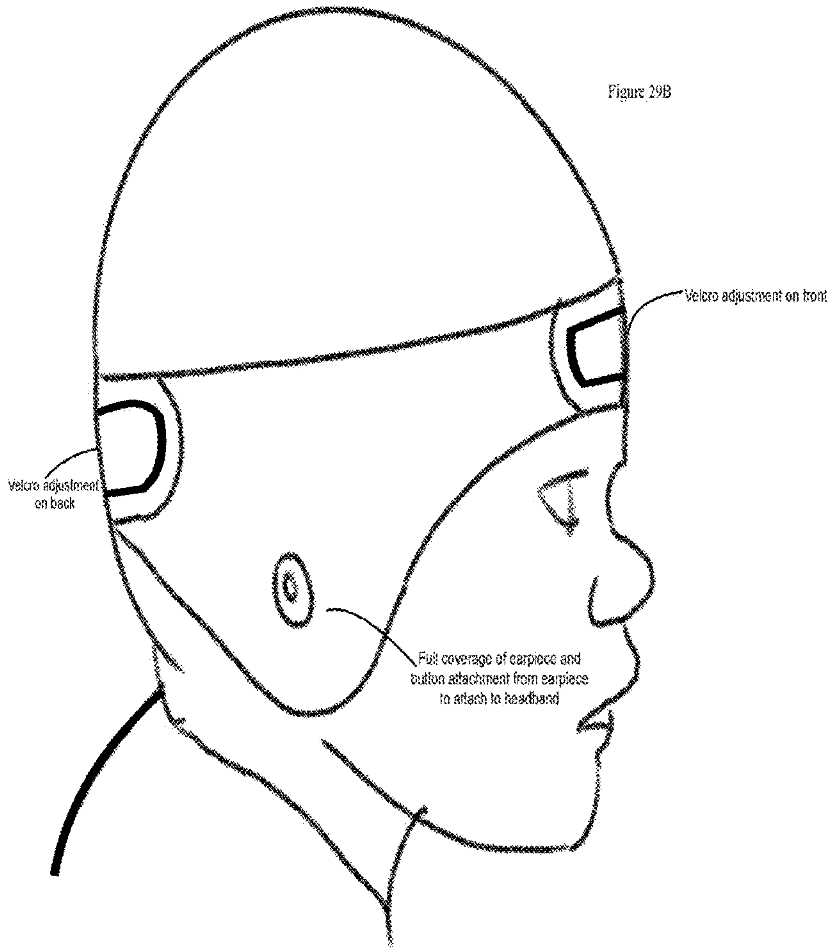
FIG. 29B depicts an infant wearing the embodiment shown in FIG. 29A.
Figure 30:
FIG. 30 depicts an infant wearing a cap.
Figure 31:
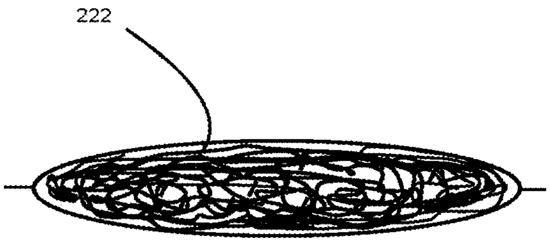
FIG. 31 depicts a cross-sectional view of an embodiment of padded member 108 of FIG. 4C. An embodiment of insulating material 222 is shown.

FIGS. 19, 20, and 21 depict an embodiment of a sound attenuating assembly 100. headpiece 113 may have one or more headpiece pockets (713 *a*, 713 *b*-see FIGS. 15, 17A, and 17B) or may have a fastener patch, such as a hook-and-loop patch that may attach to a dampening assembly's corresponding fastener patch or a covered dampening assembly's corresponding fastener patch.

Any component with the word "member", such as concave member 102 or compressible member 104, may be of any shape; in the preferred embodiments, may be circular, oval, squarish, rectangular, ear-shaped, or elliptical, Sound attenuating assembly 100 may include a dampening assembly that may include a concave member 102, which may be large enough for other components to be disposed within concave member 102; a compressible member 104, a dividing member 106 (which is not present in some embodiments); a padded member 108

Compressible member 104 may be made of foam or other compressible material.

Dividing member 106 may be made of card stock;

A padded member 108 may be included;

headpiece 113 may cover the ears, at least some of the neck and at least some of the head of a wearer;

A cover 300 may be made from cloth or some other material.

Figure 5A:
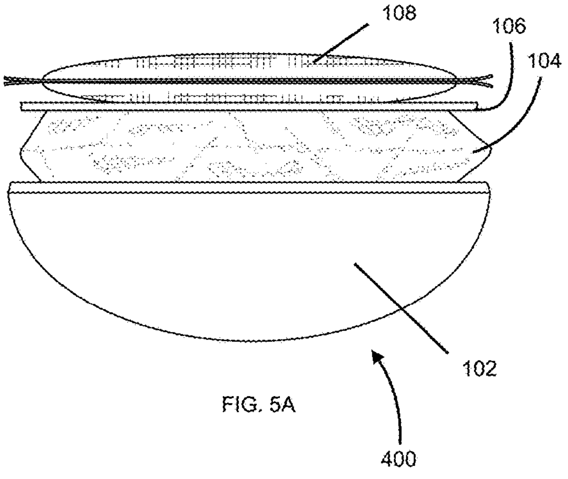
FIG. 5A depicts a side view of a dampening assembly 200.
Figure 5B:
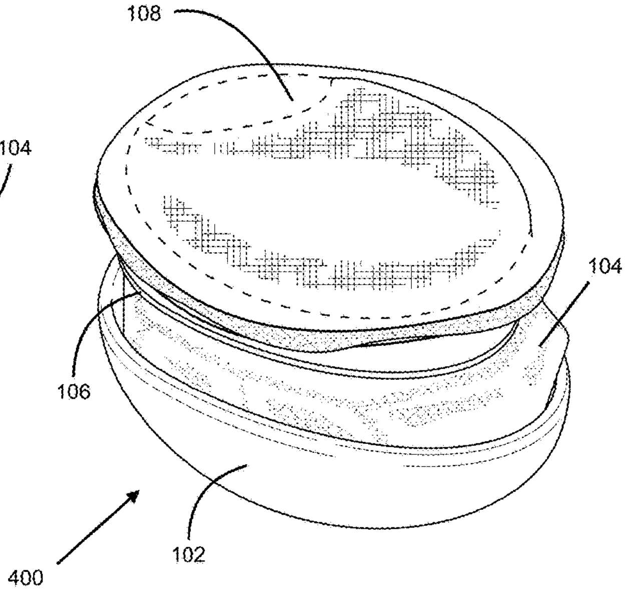
FIG. 5B depicts a perspective view of the embodiment of FIG. 5A.
Figure 6:
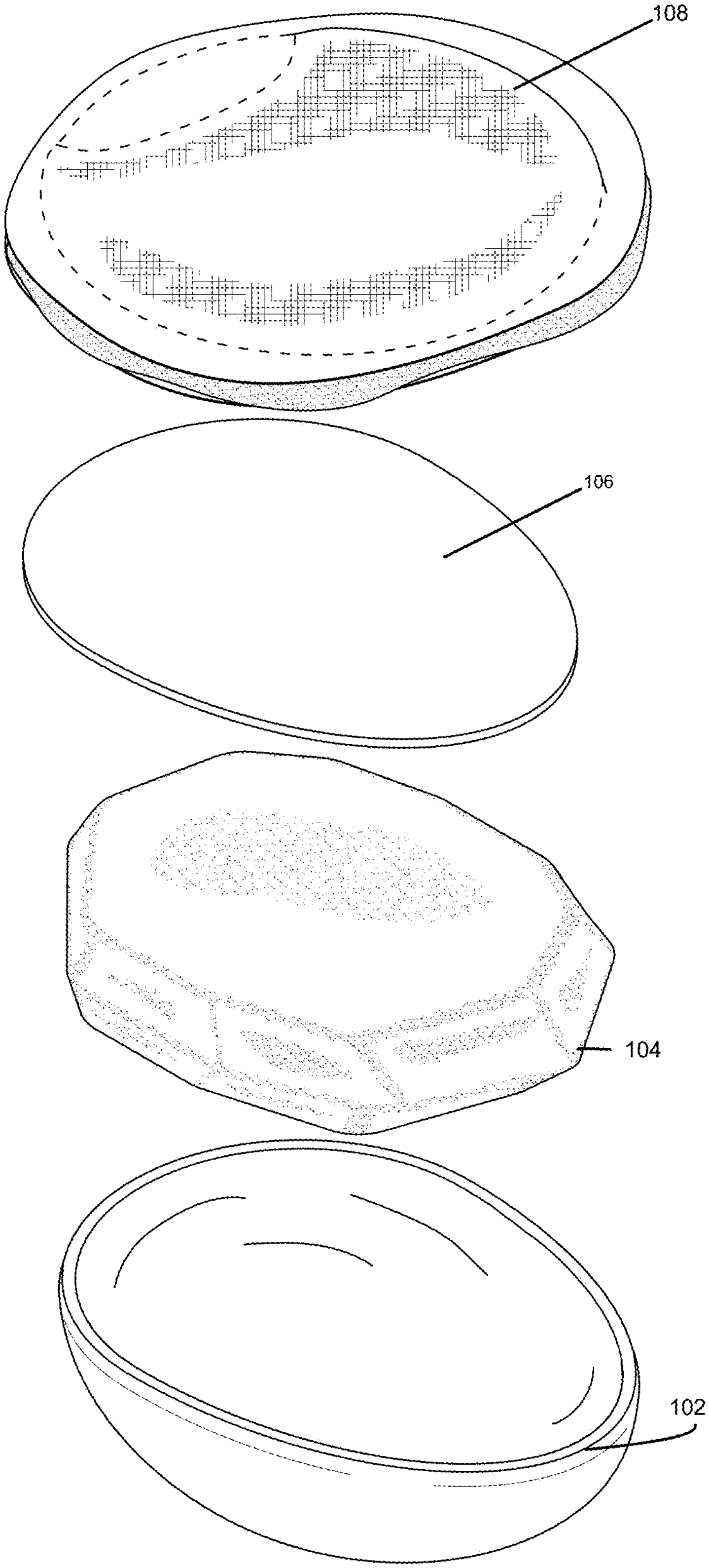
FIG. 6 depicts an exploded view of the embodiment of FIG. 5A.
Figure 7:
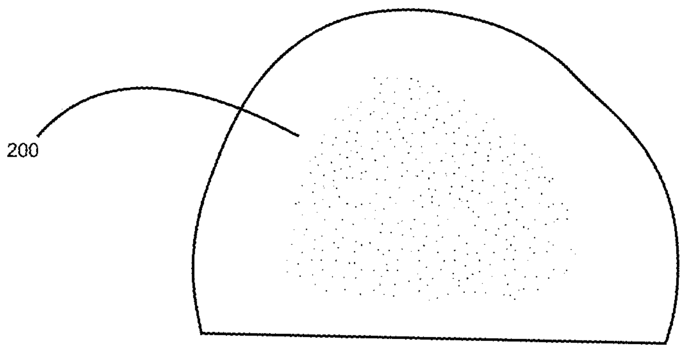
FIG. 7 depicts a first covering front portion.
Figure 8:
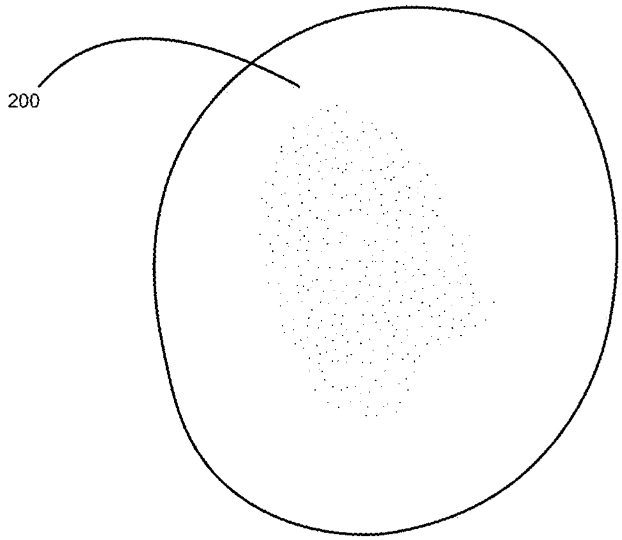
FIG. 8 depicts a covering back portion.
Figure 9:
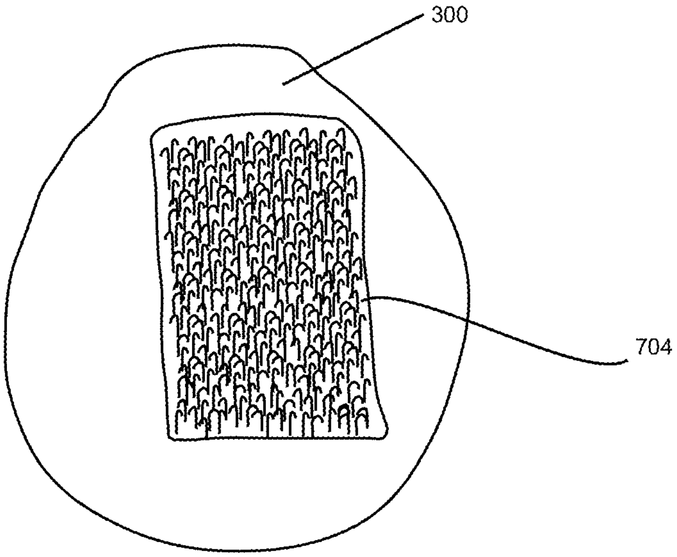
FIG. 9 depicts a back view of a covered dampening assembly.
Figure 10:
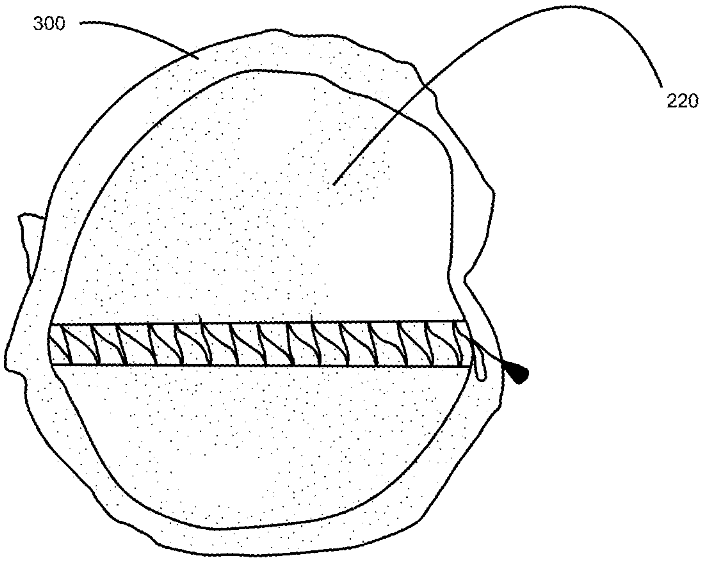
FIG. 10 depicts a front view of the covered dampening assembly of FIG. 9.

An embodiment of dampening assembly 400 is shown in FIG. 5B.

4 pieces may be used to make the headpiece 113; 3 pieces may be used to make the pocket. Dampening assembly and covered dampening assembly may reduce sound levels between 10 and 100 db with a target reduction of 30-50 db.

Cardstock may be the 140 lb type; height of dividing member 106 may be 3.2 cm and the width of dividing member 106 may be 3 cm.

concave member 102 may be a silicone egg mold or any other concave object that is large enough to engulf or partially engulf compressible member 104. The width of concave member 102 may be 4.2 cm; the length of concave member 102 may be 4.2 cm. The thickness of concave member 102 may be between 0.1 mm and 100 mm.

The length by width dimensions of padded member 108 may be 4.5 cm by 4 cm.

Foam may be used as the main material of the compressible member 104; in some embodiments the length by width dimensions of the compressible member 104 may be 3.9 cm by 3.4 cm and may be 1.5 cm in thickness.

Upper circumference of headpiece 113 may be 18.1 cm. headpiece 113 may have an upper central horizontal width of 11.4 cm; bottom horizontal width may be 14 cm; a band of material with a fastener on one end that may attach detachably to a fastener of the head piece may be coupled to an opposing side of the headpiece to form a chinstrap 502.

Cover 300 may be 4.5 cm by 5.2 cm.

Width circumference of cover 300 may be 12 cm.

Height circumference of cover may be 13 cm.

Sound attenuating assembly 100 may have removeable and adjustable ear pieces to ensure proper fit. It may also have an adjustable chin strap to ensure that the sound attenuating assembly is fitted snugly around a wearer so as to form a substantial seal around the ear.

Ear covering may be worn by babies/children/adults to decrease the noise level. It may work by having materials that attenuate sound placed over the ear and may include a headpiece 113; headpiece 113 may be a band or headband or it may be a head covering with a neck covering portion and one or more ear flaps.

Each part of the earpiece may serve a function of lowering/attenuating sound and/or providing comfort in wear/use of the product. Earpiece may include one or more materials to provide attenuation and/or comfort. The design may include various materials such as a silicone convex ear piece, viscoelastic foam, cardstock, wool/cotton organic material blend. A pocket may exist to place earpiece materials in. The pocket may contain hook and loop fastener for adjustment of ear piece placement. The pocket may detach and be adjusted for proper fit around the ear. Materials may also be removed from pocket for washing of pocket. An ear piece may be on each side for placement over each ear. Head piece may provide comfortable fit around the head and may include a hook and loop fastener strip to attach the earpiece. The headpiece 113 may also contain a strap, which may be hook and latch, to ensure proper fit of the ear pieces over the ear. The headpiece 113 may also include designer elements such as bows. The ear pieces and head piece may be sized to fit various head sizes.

The ear piece and its materials may contribute sound attenuation and comfort.

The head piece and its parts may act to hold the ear piece in its proper place to ensure proper attenuation over the ears.

The head piece may be used as a headpiece 113 for warmth or style, yet also may serve to support the ear pieces.

The materials in the ear piece work to attenuate sound and may be comfortable

The head piece may hold the ear pieces in place over the ears and may provide a surface for allowing for the adjustment of ear pieces.

At least a portion of the sound attenuating materials may be preferably placed over the ear to attenuate/decrease/lower the sound level. Headpiece 113 may have a strap or other member for holding a dampening assembly or covered dampening assembly in its proper place. The upper portion of the head piece may be substantially elevated so as to not cover or obstruct the eyes or nose. The head piece may also provide sufficient fit and covering to properly hold/support the ear pieces in their proper placement over the ears.

The ear piece may be of various shapes, so long as it still forms on around the ear. Various materials may be used in the ear piece, including materials that are known to have sound attenuating properties.

Various designs and patterns may be used for the head piece; in the preferred embodiments, the head piece may use a fastener with detachable-attachable properties, such as a hook loop fastener or other type of adhesive or detachably adhesive material that may be located in the area of the headpiece that would touch or be facing a wearers ear; and a patch with a fastener may also be coupled to that location so that a covered dampening assembly with a fastener 704 on the outer surface (or a dampening assembly without a cover that has a fastener on the outer surface of the concave member 102) may then be adjustably coupled to the patch such that the covered dampening assembly may be coupled with the head piece 13 or held in place against the head piece; the location 700 at which such a patch 702 for coupling the covered dampening assembly 400 to the head piece is shown in the figures; the shape of the patch 702 may be rectangular, elliptical, or some other shape. A patch 702 may be coupled to one side of the headpiece 113 and a second patch may be coupled to an opposing side of the headpiece 113 since most individuals have two ears and would usually benefit from having a dampening assembly 400 or covered-dampening assembly 200 attached to the patch 702 and a second dampening assembly 400 or a second covered-dampening assembly 200 also being attached to a second patch. in the preferred embodiments an adhesive or detachably adhesive material is located on the outer surface of the ear piece and substantially couples with a support strip that is made of a material that allows for the adhesive or detachably adhesive material of the outer surface of the ear piece to attach of detachably attach to the support strip. The support strip may be coupled to the inner surface of the device.

Listed materials are nonlimiting. The parts in the ear piece, also known as a dampening assembly or covered dampening assembly, may be of a type of material that is not explicitly listed in this patent application. If another material or combination of materials is found to provide similar attenuation and comfort. The ear piece cannot be eliminated. The design and pattern of the head piece could change as long as it provides support for the ear pieces. The cover may have a back portion and two front portions; the two front portions may overlap but also may be open such that a dampening assembly may be slid into an inner cavity of the cover and be substantially engulfed by the combination of the back portion of the cover and the two front portions; a zipper may be used or a fastener may be used such as a button or hook-loop fastener system having a first hook loop fastener opposed to a mateable second hook loop fastener to reclosably close the opening of the cover.

Embodiments may include bone conduction piece that would play sounds similar to what may be heard in the womb including mother's voice, heartbeat, and other ambient sounds. Bone conduction is the way a fetus hears sound in utero. It may also include the use of developmentally appropriate sounds to improve auditory development.

Any of the members or layers may be removed. It is possible the cardstock could be left out of the ear piece as it may lose its support integrity over time and use.

The product could be used on babies outside of the NICU or hospital setting or full-term babies. It could also be used for small children, children, adults or anyone with a need for sound attenuation from loud environments. The product may be sized for various head sizes. The ear pieces may be worn over the ears and may be held in place as to stay over the ear continuously.

The ear pieces may be made with materials that attenuate sound and are feasible and comfortable in the wear of the product. The head piece may be made of material that is soft and flexible for ease and comfort in wearing.

Wearing the ear piece over the ears and being held in place to create proper fit is preferred. Cotton may be used for the headpiece 113; concave member 102 may be made of silicone and some embodiments a silicone mold such as a Wilton silicone egg mold may be used for concave member 102.

This application incorporates by reference and claims the benefit of U.S. application Ser. No. 16/373,646, which was filed on Apr. 3, 2019, and claims the benefit of a) the provisional application filed on Apr. 3, 2018 with an application number of 62/652,238 and b) the provisional application filed on Mar. 30, 2019 with an application number of 62/826,994.

This embodiment consists of two main areas: the earpiece and the headpiece. The earpiece is embodimented for sound attenuation, and the headpiece holds the earpieces in place. Below are descriptions of the earpiece and headpiece embodiments.

As disclosed in applicant's previous applications, positioning of earpieces and increased effectiveness of earpiece are desirable. The present application discloses an earpiece embodiment that reduces sliding movements or movements of the earpiece or the headpiece; a embodiment is disclosed that goes around the outside of the ear to provide a concave shape around the ear and also to create space around the ear, which puts little to no pressure on the ear.

Figure 11:
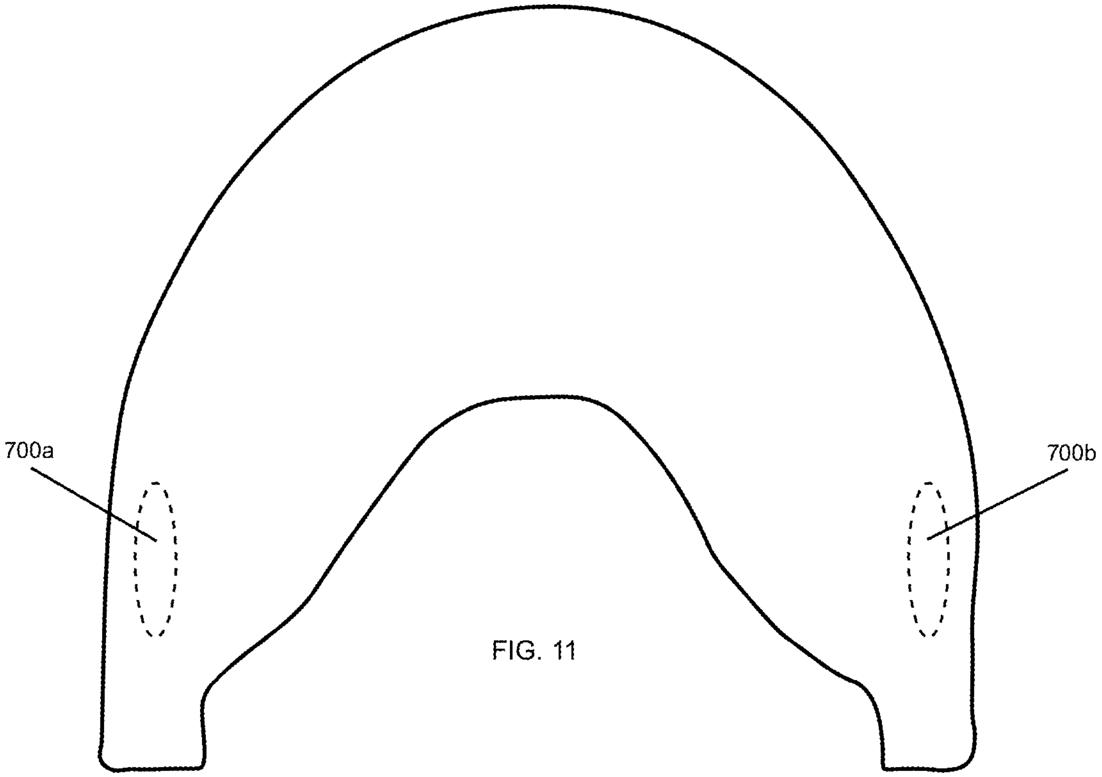
FIG. 11 depicts a first front piece of a headpiece 113.

The material of the earpiece may consist of the original outer silicone layer (FIG. 11*b*), followed by a layer of viscoelastic foam (FIG. 11*c*). Both materials may provide sound attenuation. The earpiece may consist of an exterior sound attenuating shell (silicone material) (FIG. 11*b*), the inner sound attenuating layer (viscoelastic foam material) (FIG. 11*c*), and padded oval-ring shaped ear cushions that are configured to be pressed around the ear on the skull (foam material) (FIG. 11*c*). The additional two layers of cardstock or wool-cotton blend material may be eliminated in some embodiments. By using silicone and foam materials, the layers may be molded and blown into one piece in the manufacturing process (FIG. 11*a*), which will allow for ease in manufacturing and assembly. Another benefit includes being more easily cleaned by surface wiping the earpiece rather than disassembly and washing of material. This allows for increased sanitation in the hospital setting. The original level of sound attenuation that consisted within the original 4 materials can be achieved through increasing the thickness of the silicone layer and foam and by creating a light seal around the ear with the improved embodiment. The thickness of the silicone outer layer may be between 1-3 ml thick.

The thickness of the foam layer may be less than 2 cm in thickness or the density of the material will be increased.

Multiple sizes of the earpiece may be manufactured and used depending on the size and growth of the infant.

The Exterior Shell

The exterior shell may be composed of silicone that is pliable for comfort and flexibility. The silicone material provides both structure to the earpiece and sound attenuation. The thickness of the silicone outer layer may be between 1-3 ml thick.

From the top (FIG. 11*d*) and side view (FIG. 11*a*), the shape of the earpiece may be a round oval shape seen in original earpiece embodiment or may extend diagonally in a conal direction from the outer edge of the oval ring and flatten to allow for proper attachment of the button, which exists to attach to the headpiece.

From the bottom view (FIG. 11*e*), it may be an oval and concave shape that may circle around the outside of the entire ear and cups around the ear. The exterior back of the outer shell may flatten. The exterior back of the earpiece embodiment may also include a button that may be a small, soft, flexible button that may be attachable to the headpiece and may allow for adjustment on the headpiece. The button may allow for pivotal adjustment on the earpiece at multiple degrees depending on the shape and placement of the ear. The button may consist of the same silicone material used on the outer shell of the earpiece and may be attached via a mold in the manufacturing process (FIG. 11*b*). The button may have a stem that may be less than 0.5 centimeters in height and 0.5 centimeters in width. The stem may attach to the upper button which may help hold the earpiece in place so as to not pop out of location on the headpiece. The upper button portion may be less than 1 centimeter diameter and less than 0.5 centimeters height. It may also have a flat or dome shape.

Inner Sound Attenuating Layer

The inner layer may be composed of a sound attenuating foam (such as visco elastic or antimicrobial polyurethane), additional silicone, or flexible plastic, or combination of materials to provide sound attenuation and comfort around the ear (FIG. 11*c*). The inner layer of the earpiece may be adhered to the exterior silicone shell via manufacturing. The shape may be concave as to allow room for the ear to fill the space when it is placed on/around the ear. The thickness of the foam layer may be less than 2 cm in thickness or the density of the material will be increased. The foam material may be placed in some embodiment as a separate piece that required assembly and may be placed in other embodiments as a single piece. By adhering the outer silicone layer and inner foam layer, it creates an ease in manufacturing, ease of cleaning and sanitation, and improved function.

Outer Ring

The oval ring of the earpiece will extend around the outside of the ear to create a ring around the ear (FIG. 11*c*). The material may consist of a soft foam for comfort and flexibility allowing the placement to follow the curvature of the skull. The ring may function to create light gentle pressure so as to not create any excessive pressure on the soft skull bones around the ear. The oval ring will include a rounded cushion to decrease any pressure points and evenly distribute the light pressure around the ear. The light seal also creates sound attenuation by decreasing the amount of sound that gets through the earpiece which thus increases the effectiveness of the sound attenuation creating a sound level more appropriate for the infant. The ring may also function to hold the earpiece in place over the ear to prevent movement and sliding of the earpiece. The thickness of the ring may be approximately 1 cm thick and less than 1 cm wide.

Sound Level Sensor

An audio sensor may be included in the earpiece that allows for data tracking of the infants dB level exposure. The sensor may be placed inside the concave earpiece to measure the sound level the infant is exposed. The concave shape of the earpiece allows for placement of the sensor within the earpiece without touching or pressuring the ear. The data tracking allows for increased awareness of environmental sound levels and the effectiveness of the earpiece in attenuating the sound to acceptable developmental levels. The sensor may include a microphone on the inside of the earpiece to capture the sound level and a sensor or probe device that is exposed to the outside of the earpiece to capture the environmental sound level. Through wireless, bluetooth, or other connection technology, data may be tracked to improve the auditory environment and outcome of the infant.

Original Earpiece

Figure 12:
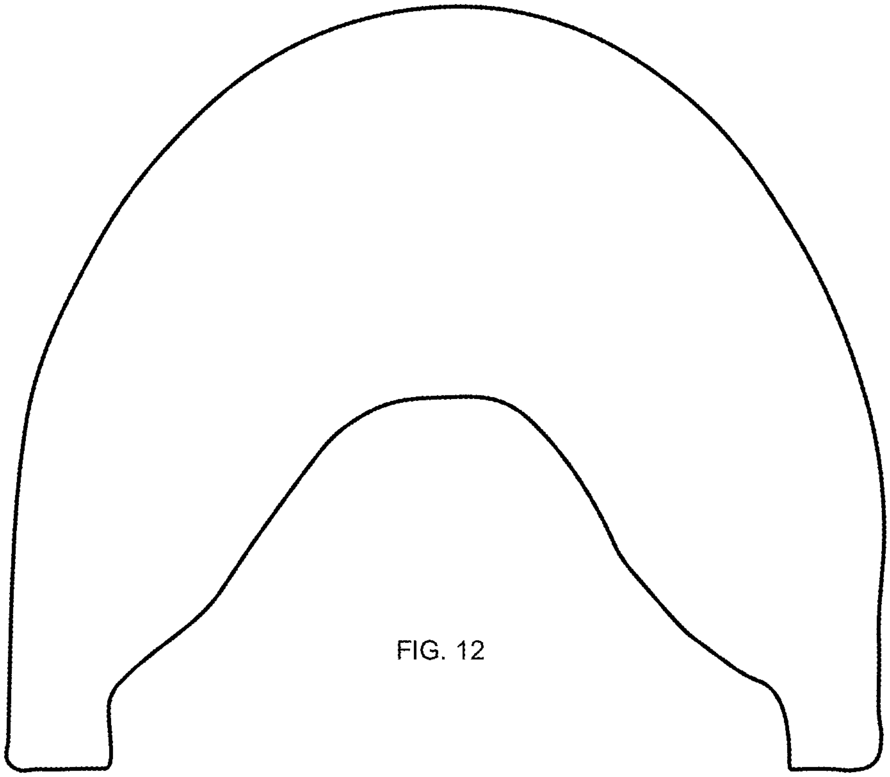
FIG. 12 depicts a second front piece of a headpiece 113.

The original earpiece may be changed to have a silicone button molded to the exterior back of the silicone outer layer (FIG. 12*a*). The button may be used for attachment to the headpiece. The button allows for pivotal adjustment on the earpiece at multiple degrees to accommodate the placement of the ear and ensure proper placement of the earpiece over the ear. The button may consist of the same silicone material used on the outer silicone layer of the earpiece and will be attached via a mold in the manufacturing process (FIG. 12*b*). The button may have a stem that may be less than 0.5 centimeters in height and 0.5 centimeters in width. The stem may attach to the upper button which will help hold the earpiece in place so as to not pop out of location on the headpiece. The upper button portion may be less than 1 centimeter diameter and less than 0.5 centimeters height. It may also have a flat or dome shape. The outer material cover of the earpiece will have an elastic hole allowing for the silicone button to pop through for attachment to the headpiece.

Headpiece

Upon testing the original headpiece (cap style embodiment) on premature babies in a neonatal intensive care unit, additional embodiment options were developed to overcome the constraints of the cap embodiment. There may be multiple headpiece embodiments needed to meet the needs of the infant depending on size, ability to maintain temperature, medical equipment in use, and oxygen needs (nasal cannula, cpap, ventilator, etc.). Because different equipment, particularly oxygen equipment, requires various levels of access to the forehead and top of head area, cap wearing may be challenging in certain situations. Also, the goal is to have the infant maintain body heat on its own, so cap wearing for long periods of time is discouraged in some NICU settings. Multiple headpieces may need to be utilized depending on the many factors of the infant including, but not limited to size of head and ears, ability to maintain temperature, medical equipment in use, and oxygen needs (nasal cannula, cpap, ventilator, etc.). For this reason, multiple headpiece embodiments have been developed to meet the medical needs of the infant.

Behind-the-Head Headpiece

Figure 13:
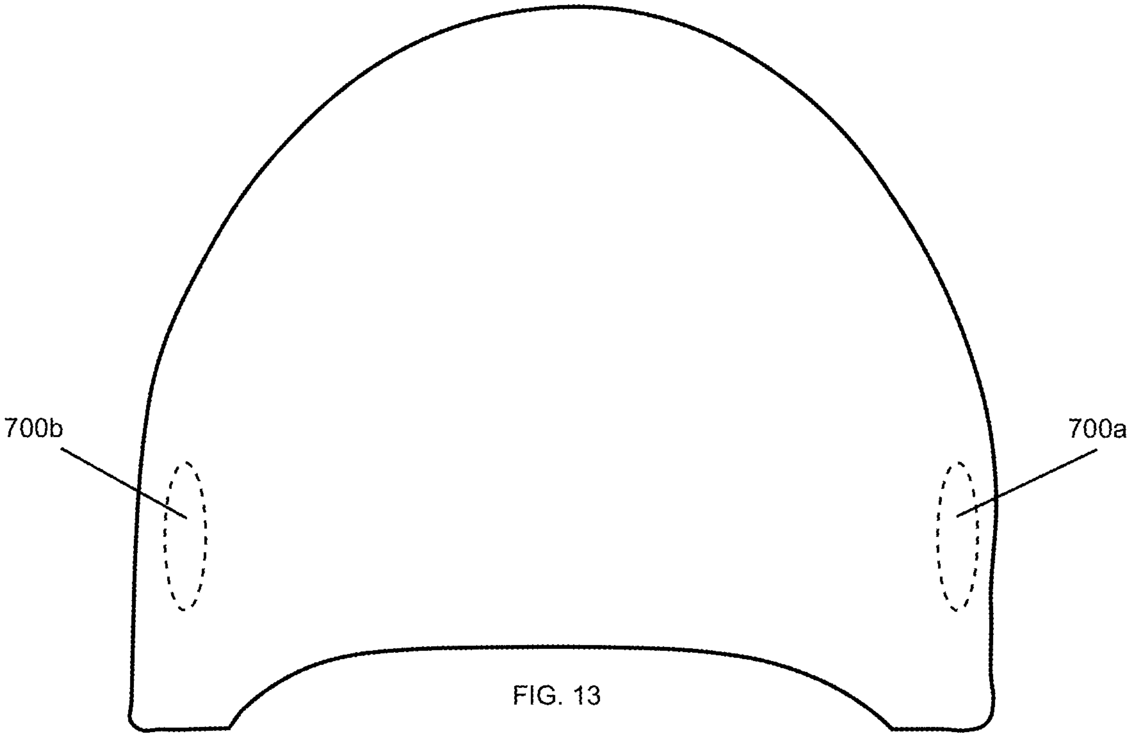
FIG. 13 depicts a first back piece of a headpiece 113.

One of the alternative headpiece embodiments utilizes the back of the head with a behind-the-head headband. It may form a semi circular shape on the back of the head that attaches to the outer side of each earpiece via a silicone button on the earpiece (FIG. 13*a*). The headband includes an upper band and lower band that join together with a curved U-shape where the earpieces attach (FIG. 13*a*). From the U-shape, the upper and lower band diverge at approximately 30 degrees and wrap around and cradle the back side of the head, creating light pressure, which acts to keep the earpieces in place (FIG. 13*b*). The middle portion, between the upper and lower band, may comprise a breathable mesh elastic fabric or other breathable material for structure (FIGS. 13*a* & *b*). The upper and lower band of the behind-the-head embodiment increase the support to keep the earpieces in place without interfering with most medical equipment. The upper band may be embodimented at the aforementioned angle to lay below the lower fontanel on the head as to not create any pressure on the soft spot. The headband embodiment also allows for evenly distributed pressure as to not create hot spots or excessive pressure on any one spot of the skull (FIG. 13*b*).

The upper and lower bands may adjust to allow for sizing to various head sizes and proper contouring to the head and to create light pressure to properly hold the earpieces against the head (FIG. 13*c*). The upper and lower bands may consist of a slide mechanism comprising an inner band (made of a flexible plastic or metal material) that is firmly encased in an outer sleeve (made of a flexible plastic or metal material). The outer band may firmly encase the inner band as to maintain the adjusted size and hold in place the inner band. The inner band slides into the outer band allowing for adjustability for different head sizes. The adjustability allows the bands to follow the curvature of the head and lay properly against the head for comfort. The outer sleeve may have a lip at the ends to stop the inner band from slipping out. The outer sleeve of both the upper and lower bands may be covered in a soft padded material such as neoprene to ensure comfort against the infant head. Adjustments may be made by lightly pulling on the headpiece near the earpiece for the slide adjustment to move.

Both earpiece embodiments (original and improved embodiment) may attach to the behind-the-head headband via the silicone button. A small hole in the neoprene fabric allows the button to slip through and be held snug. The button attachment may allow for the angle of the earpieces to be adjusted (FIG. 13*a*)

The headband may also consist of an additional strap that can attach to the side of the headpiece via latch or velcro and adjust toward the forehead for additional support if equipment allows (FIG. 13*d*). The strap may also consist of a neoprene material (or other soft cushioned material) that attaches to the outer sides of the earpieces and wraps around the forehead for added stability of the earpieces. In some situations, the strap may be removable and optional.

Full Circular Headpiece

Figure 14:
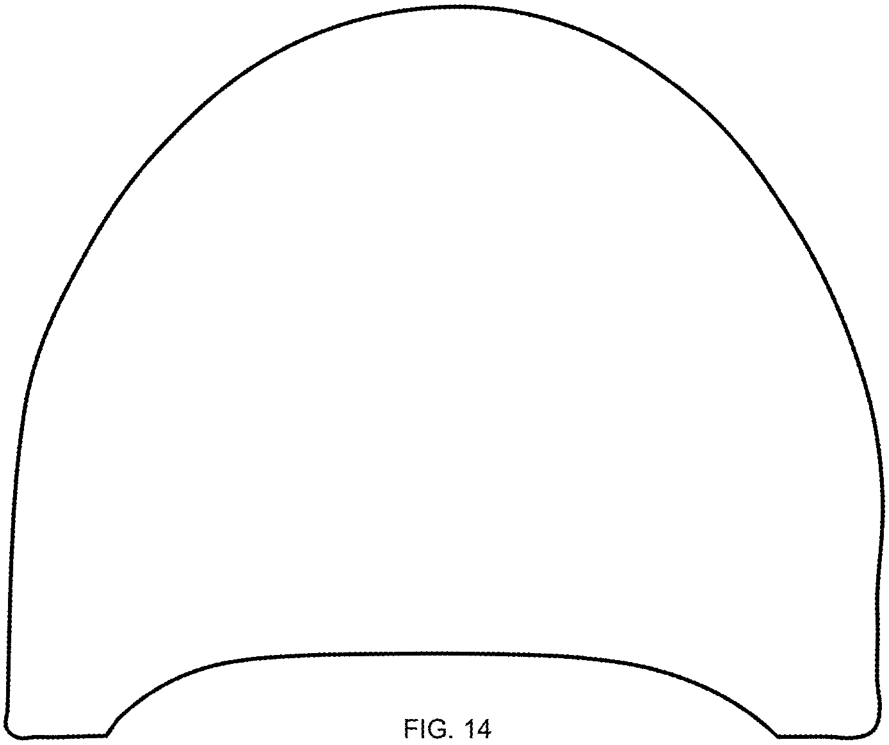
FIG. 14 depicts a second back piece of a headpiece 113.

An additional headpiece embodiment may be a full circular headband that wraps around the back of the head and meets at the forehead with velcro straps for adjustability (FIG. 14*b*). The headband may also have velcro adjustability in the back for further sizing up or down if needed and for proper placement of the earpieces over the ears (FIG. 14*b*). The headband may be made of stretchable and cushioned material such as, but not limited to neoprene fabric. The headband may fully cover or partially cover a length of the forehead and may create light pressure over the earpieces to keep the earpieces from moving or sliding around (FIG. 14*a*). The headband may angle above the eyes to rest on the forehead for maximum stability and to not obstruct the eyes of the infant (FIG. 14*b*).

Some earpiece embodiments may attach to a full circular headband via a silicone button. A small hole in the neoprene or other headband fabric may allow the button to slip through a portion of the headband and the button may be held snug by headband fabric or other materials of the headband. The button attachment may allow for the angle of the earpieces to be adjusted for proper placement around the ear (FIG. 14*b*).

Cap

Figure 15:
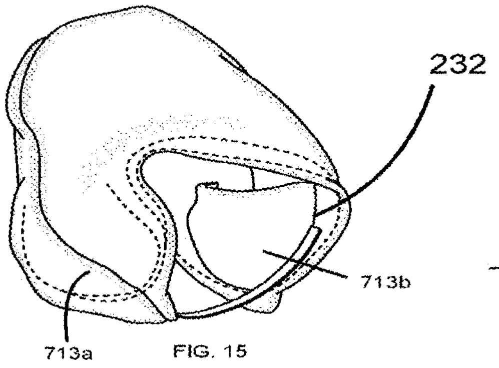
FIG. 15 depicts an embodiment of a headpiece 113.
Figure 16:
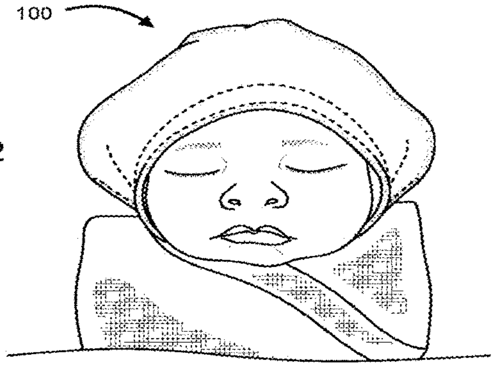
FIG. 16 depicts the embodiment of the headpiece 113 of FIG. 15 being worn by an infant.

The cap may be a soft beanie-style embodiment made of various materials including mesh, cotton, polyester, and/or spandex. The cap may secure the earpieces against creating light pressure so the earpieces stay in proper position over the ears (FIG. 15). The cap may be secured with a chin strap.

Some earpiece embodiments may attach to the cap via the silicone button. A reinforced hole cap fabric, which may be a small hole, may allow the button to slip through the cap and may be held snug. The button attachment may allow for the angle of the earpieces to be adjusted for proper placement around the ear. The silicone button attachment may replace the velcro attachment seen in the original embodiment (FIG. 15).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A sound attenuating assembly configured to be worn by a human, comprising:
- a headpiece comprising an inner surface;
- a covered-dampening assembly comprising:
  - a cover; and,
  - a dampening assembly disposed within the cover;
  - the dampening assembly comprising:
    - a padded member;
    - a compressible member; and,
    - a concave member;
- wherein the padded member is coupled to the cover, the padded member is coupled to the compressible member;
- wherein the dampening assembly further comprises a separating member disposed between the padded member and the compressible member; wherein the separating member is coupled to the padded member and is coupled to the compressible member:
- wherein the concave member comprises a silicone surface;
- wherein the compressible member comprises a foam material;
- wherein the compressible member further comprises a foam material selected from a group consisting of a viscoelastic foam, a memory foam, a Dunlop latex foam, and a furniture foam;
- wherein the padded member comprises a cloth outer shell substantially engulfing an amount of insulating material.

2. The sound attenuating assembly of claim 1 wherein the cloth outer shell of padded member comprises wool and the amount of insulating material comprises cotton.

3. A sound attenuating assembly configured to be worn by a human, comprising:
- a headpiece comprising an inner surface;
- a covered-dampening assembly comprising:
  - a cover; and,
  - a dampening assembly disposed within the cover;
  - the dampening assembly comprising:
    - a padded member;
    - a compressible member; and,
    - a concave member;
- wherein the padded member is coupled to the cover, the padded member is coupled to the compressible member;
- wherein the covered dampening assembly is disposed within a pocket, the pocket being coupled to a lateral, inner surface of the headpiece.

4. The sound attenuating assembly of claim 3, the pocket nestling against a human ear.

5. A sound attenuating assembly configured to be worn by a human, comprising:
- a headpiece comprising an inner surface;
- a covered-dampening assembly comprising:
  - a cover; and,
  - a dampening assembly disposed within the cover;
  - the dampening assembly comprising:
    - a padded member;
    - a compressible member; and,
    - a concave member;
  - wherein the padded member is coupled to the cover, the padded member is coupled to the compressible member;
  - wherein the headpiece comprises a fastening patch coupled to a lateral, inner ear flap surface of the headpiece;
  - wherein the fastening patch further comprises a first fastener surface selected from the group consisting of a hook-and-loop fastener, a magnetic fastener, a hook-and-pile fastener, a zipper, a button, a reclosable fastener;
  - wherein the covered dampening assembly further comprises a second fastener surface detachably coupled to the first fastener surface, wherein the second fastener surface is selected from the group consisting of a hook-and-loop fastener, a magnetic fastener, a hook-and-pile fastener, a zipper, a button, a reclosable fastener.

6. The sound attenuating assembly of claim 5 wherein the headpiece further comprises a chinstrap having a third fastener and a fourth fastener coupled to an edge portion of the headpiece, the third fastener being detachably coupled to the fourth fastener.

7. The sound attenuating assembly of claim 6 wherein an average thickness of the compressible member is greater than an average thickness of the concave member.

8. A method of using a sound attenuating assembly comprising:

providing a dampening assembly comprising a padded member; a separating member; a compressible member; and a concave member;

providing a headpiece having a fastener at a first ear-adjacent location and having a second fastener at a second ear-adjacent location;

substantially disposing the dampening assembly within a cover having a foldable element thereby forming a covered dampening assembly; and, detachably attaching an outward facing detachable fastener of the covered dampening assembly to the fastener at the first ear-adjacent location of the headpiece.

* * * * *